(12) United States Patent
Zhong et al.

(10) Patent No.: US 10,869,222 B2
(45) Date of Patent: Dec. 15, 2020

(54) DATA FRAME TRANSMISSION METHOD AND APPARATUS FOR VIRTUAL ELASTIC CPRI INTERFACE

(71) Applicant: Huawei Technologies Co., Ltd., Shenzhen (CN)

(72) Inventors: Qiwen Zhong, Shenzhen (CN); Qiuyou Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 144 days.

(21) Appl. No.: 15/870,383

(22) Filed: Jan. 12, 2018

(65) Prior Publication Data

US 2018/0139649 A1 May 17, 2018

Related U.S. Application Data

(63) Continuation of application No. PCT/CN2016/087498, filed on Jun. 28, 2016.

(30) Foreign Application Priority Data

Jul. 17, 2015 (CN) .......................... 2015 1 0423562

(51) Int. Cl.
*H04W 28/06* (2009.01)
*H04L 5/00* (2006.01)
*H04W 88/08* (2009.01)

(52) U.S. Cl.
CPC .......... *H04W 28/06* (2013.01); *H04L 5/0044* (2013.01); *H04W 88/08* (2013.01)

(58) Field of Classification Search
CPC .............................. H04W 28/06; H04L 5/0044
See application file for complete search history.

(56) References Cited

U.S. PATENT DOCUMENTS

| 2013/0077603 A1* | 3/2013 | Lin | ........................ | H04W 28/06 370/336 |
| 2013/0100948 A1* | 4/2013 | Irvine | ................... | H04J 3/0632 370/350 |

(Continued)

FOREIGN PATENT DOCUMENTS

| CN | 101127969 A | 2/2008 |
| CN | 101860394 A | 10/2010 |

(Continued)

OTHER PUBLICATIONS

Machine Translation and Abstract of Chinese Publication No. CN101127969, Feb. 20, 2008, 10 pages.

(Continued)

*Primary Examiner* — Ricky Q Ngo
*Assistant Examiner* — Stephen N Steiner
(74) *Attorney, Agent, or Firm* — Conley Rose, P.C.

(57) ABSTRACT

A data frame transmission method and apparatus for a virtual elastic Common Public Radio Interface (CPRI), where the method includes constructing a super frame of the virtual elastic CPRI, where the super frame of the virtual elastic CPRI is a data frame of a CPRI physical interface equivalent to N times of a reference rate, and N is a positive integer, dividing a frame structure of a physical interface into a plurality of timeslots, where bandwidth of the plurality of timeslots is not less than the reference rate, placing the super frame of the virtual elastic CPRI into at least one timeslot of the plurality of timeslots in the frame structure of the physical interface to obtain a new data frame, and sending the new data frame to a receive end using the physical interface. Hence, network bandwidth utilization can be improved.

23 Claims, 22 Drawing Sheets

(56) References Cited

U.S. PATENT DOCUMENTS

| | | | |
|---|---|---|---|
| 2014/0003565 A1* | 1/2014 | Yamamoto | H04L 7/0087 375/359 |
| 2015/0195740 A1 | 7/2015 | Shor et al. | |
| 2015/0281983 A1* | 10/2015 | Garcia | H04W 24/06 370/252 |
| 2016/0277964 A1* | 9/2016 | Xu | H04W 28/065 |

FOREIGN PATENT DOCUMENTS

| | | |
|---|---|---|
| CN | 102307395 A | 1/2012 |
| CN | 103546229 A | 1/2014 |
| EP | 2786209 A1 | 5/2014 |
| KR | 20080076629 A | 8/2008 |

OTHER PUBLICATIONS

Machine Translation and Abstract of Chinese Publication No. CN102307395, Jan. 4, 2012, 19 pages.
Machine Translation and Abstract of Korean Publication No. KR20080076629, Aug. 20, 2008, 16 pages.
Foreign Communication From a Counterpart Application, Chinese Application No. 201510423562.1, Chinese Office Action dated Feb. 2, 2019, 7 pages.
Machine Translation and Abstract of Chinese Publication No. CN103546229, Jan. 29, 2014, 17 pages.
Foreign Communication From a Counterpart Application, International Application No. PCT/CN2016/087498, English Translation of International Search Report dated Oct. 9, 2016, 2 pages.

\* cited by examiner

| CPRI rate options 491.52 Mbps x n | | | x1 rate | x2 rate | x4 rate |
|---|---|---|---|---|---|
| Physical interface encoding manner | | | 8B/10B | 8B/10B | 8B/10B |
| Actual rate Mbps of a physical interface after encoding | | | 614.4 | 1228.8 | 2457.6 |
| Super frame synchronization head control word #Z.0 — A higher rate indicates a larger quantity of bytes | Synchronization byte | #Z.0.0 | 0xBC | 0xBC | 0xBC |
| | Padding byte | #Z.0.1 | | 0x50/C5 | 0x50/C5 |
| | | #Z.0.2 | | | 0x50 |
| | | #Z.0.3 | | | 0x50 |
| | | #Z.0.4 | | | |
| | | #Z.0.5 | | | |
| | | #Z.0.6 | | | |
| | | #Z.0.7 | | | |
| | | #Z.0.8 | | | |
| | | #Z.0.9 | | | |
| | | #Z.0.10 | | | |
| | | #Z.0.11 | | | |
| | | #Z.0.12 | | | |
| | | #Z.0.13 | | | |
| | | #Z.0.14 | | | |
| | | #Z.0.15 | | | |
| | | #Z.0.16 | | | |
| | | #Z.0.17 | | | |
| | | #Z.0.18 | | | |
| | | #Z.0.19 | | | |
| | | #Z.0.20 | | | |
| | | #Z.0.21 | | | |
| | | #Z.0.22 | | | |
| | | #Z.0.23 | | | |

| x5 rate | x8 rate | x10 rate | x16 rate | x16 rate | x20 rate | x24 rate |
|---|---|---|---|---|---|---|
| 8B/10B | 8B/10B | 8B/10B | 8B/10B | 64B/66B | 64B/66B | 64B/66B |
| 3072.0 | 4915.2 | 6144.0 | 9830.4 | 8110.08 | 10137.6 | 12165.12 |
| 0xBC | 0xBC | 0xBC | 0xBC | 0x50 | 0x50 | 0x50 |
| 0x50/C5 | 0x50/C5 | 0x50/C5 | 0x50/C5 | 0x50 | 0x50 | 0x50 |
| 0x50 | 0x50 | 0x50 | 0x50 | 0x50 | 0x50 | 0x50 |
| 0x50 | 0x50 | 0x50 | 0x50 | 0x50 | 0x50 | 0x50 |
| 0x50 | 0x50 | 0x50 | 0x50 | 0x50 | 0x50 | 0x50 |
|  | 0x50 | 0x50 | 0x50 | 0x50 | 0x50 | 0x50 |
|  | 0x50 | 0x50 | 0x50 | 0x50 | 0x50 | 0x50 |
|  | 0x50 | 0x50 | 0x50 | /T/, 0xFD | /T/, 0xFD | /T/, 0xFD |
|  |  | 0x50 | 0x50 | /S/, 0xFB | /S/, 0xFB | /S/, 0xFB |
|  |  | 0x50 | 0x50 | 0x50 | 0x50 | 0x50 |
|  |  |  | 0x50 | 0x50 | 0x50 | 0x50 |
|  |  |  | 0x50 | 0x50 | 0x50 | 0x50 |
|  |  |  | 0x50 | 0x50 | 0x50 | 0x50 |
|  |  |  | 0x50 | 0x50 | 0x50 | 0x50 |
|  |  |  | 0x50 | 0x50 | 0x50 | 0x50 |
|  |  |  | 0x50 | 0x50 | 0x50 | 0x50 |
|  |  |  |  |  | RTVSB | RTVSB |
|  |  |  |  |  | RTVSB | RTVSB |
|  |  |  |  |  | RTVSB | RTVSB |
|  |  |  |  |  | RTVSB | RTVSB |
|  |  |  |  |  |  | RTVSB |
|  |  |  |  |  |  | RTVSB |
|  |  |  |  |  |  | RTVSB |
|  |  |  |  |  |  | RTVSB |

|  | Slot 1<br>Byte 1 | Slot 2<br>Byte 2 | Slot 3<br>Byte 3 | Slot 4<br>Byte 4 | Slot 5<br>Byte 5 | ... | Slot 16<br>Byte 16 |
|---|---|---|---|---|---|---|---|
| 0 | SyncByte | SyncByte | SyncByte | SyncByte | SyncByte | ... | SyncByte |
| 1 |  | SlowC&M |  | SlowC&M |  | ... |  |
| 2 |  | Version |  | Reserved |  | ... |  |
| 3 |  | Reserved |  | Reserved |  | ... |  |
| 4–7 |  | Ctrl_AxC |  | Ctrl_AxC |  | ... |  |
| 8 |  | Reserved |  | Reserved |  | ... |  |
| ... | ... | ... | ... | ... | ... | ... | ... |
| 15 |  | Reserved |  | Reserved |  | ... |  |
| 16–63 |  | VS&FCM |  | VS&FCM |  | ... |  |
| 64 |  | HFN |  | Reserved |  | ... |  |
| 65 |  | SlowC&M |  | SlowC&M |  | ... |  |
| 66 |  | StartUp |  | Reserved |  | ... |  |
| 67 |  | Reserved |  | Reserved |  | ... |  |
| 68–71 |  | Ctrl_AxC |  | Ctrl_AxC |  | ... |  |
| 72 |  | Reserved |  | Reserved |  | ... |  |
| ... |  | ... | ... | ... | ... | ... |  |
| 79 |  | Reserved |  | Reserved |  | ... |  |
| 80–127 |  | VS&FCM |  | VS&FCM |  | ... |  |
| 128 |  | BFN |  | Reserved |  | ... |  |
| 129 |  | SlowC&M |  | SlowC&M |  | ... |  |
| 130 |  | L1 Signal |  | Reserved |  | ... |  |
| 131 |  | Reserved |  | Reserved |  | ... |  |
| 132–135 |  | Ctrl_AxC |  | Ctrl_AxC |  | ... |  |
| 136 |  | Reserved |  | Reserved |  | ... |  |
| ... |  | ... | ... | ... | ... |  |  |
| 143 |  | Reserved |  | Reserved |  | ... |  |
| 144–191 |  | VS&FCM |  | VS&FCM |  | ... |  |
| 192 |  | BFN |  | Reserved |  | ... |  |
| 193 |  | SlowC&M |  | SlowC&M |  | ... |  |
| 194 |  | Pointer p |  | Reserved |  | ... |  |
| 195 |  | Reserved |  | Reserved |  | ... |  |
| 196–199 |  | Ctrl_AxC |  | Ctrl_AxC |  | ... |  |
| 200 |  | Reserved |  | Reserved |  | ... |  |
| ... |  | ... | ... | ... | ... | ... |  |
| 207 |  | Reserved |  | Reserved |  | ... |  |
| 208–255 |  | VS&FCM |  | VS&FCM |  | ... |  |

CONT. FROM FIG. 3B

| Word 15 / Word 0 | Byte 1 | Byte 2 |
|---|---|---|
| | SyncByte | SyncByte |
| | SlowC&M | SlowC&M |
| | Version | Reserved |
| | Reserved | Reserved |
| | Ctrl_AxC | Ctrl_AxC |
| | Reserved | Reserved |
| | ... | ... |
| | Reserved | Reserved |
| | VS&FCM | VS&FCM |
| | HFN | Reserved |
| | SlowC&M | SlowC&M |
| | StartUp | Reserved |
| | Reserved | Reserved |
| | Ctrl_AxC | Ctrl_AxC |
| | Reserved | Reserved |
| | ... | ... |
| | Reserved | Reserved |
| | VS&FCM | VS&FCM |
| | BFN | Reserved |
| | SlowC&M | SlowC&M |
| | L1 Signal | Reserved |
| | Reserved | Reserved |
| | Ctrl_AxC | Ctrl_AxC |
| | Reserved | Reserved |
| | ... | ... |
| | Reserved | Reserved |
| | VS&FCM | VS&FCM |
| | BFN | Reserved |
| | SlowC&M | SlowC&M |
| | Pointer p | Reserved |
| | Reserved | Reserved |
| | Ctrl_AxC | Ctrl_AxC |
| | Reserved | Reserved |
| | ... | ... |
| | Reserved | Reserved |
| | VS&FCM | VS&FCM |

FIG. 3C

|  | Slot 1<br>Byte 1 | Slot 2<br>Byte 2 | Slot 3<br>Byte 3 | Slot 4<br>Byte 4 | Slot 5<br>Byte 5 | ... | Slot 16<br>Byte 16 |
|---|---|---|---|---|---|---|---|
| 0 | SyncByte | SyncByte | SyncByte | SyncByte | SyncByte | ... | SyncByte |
| 1 |  | SlowC&M |  | SlowC&M |  | ... |  |
| 2 |  | Version |  | Reserved |  | ... |  |
| 3 |  | Reserved |  | Reserved |  | ... |  |
| 4–7 |  | Ctrl_AxC |  | Ctrl_AxC |  | ... |  |
| 8 |  | Reserved |  | Reserved |  | ... |  |
| ... | ... | ... | ... | ... | ... | ... | ... |
| 15 |  | Reserved |  | Reserved |  | ... |  |
| 16–63 |  | VS&FCM |  | VS&FCM |  | ... |  |
| 64 |  | HFN |  | Reserved |  | ... |  |
| 65 |  | SlowC&M |  | SlowC&M |  | ... |  |
| 66 |  | StartUp |  | Reserved |  | ... |  |
| 67 | VID = 0 | VID = a | VID = 0 | VID = a | VID = 0 | ... | VID = 0 |
| 68–71 |  | Ctrl_AxC |  | Ctrl_AxC |  | ... |  |
| 72 |  | Reserved |  | Reserved |  | ... |  |
| ... | ... | ... | ... | ... | ... | ... | ... |
| 79 |  | Reserved |  | Reserved |  | ... |  |
| 80–127 |  | VS&FCM |  | VS&FCM |  | ... |  |
| 128 |  | BFN |  | Reserved |  | ... |  |
| 129 |  | SlowC&M |  | SlowC&M |  | ... |  |
| 130 |  | L1 Signal |  | Reserved |  | ... |  |
| 131 |  | Reserved |  | Reserved |  | ... |  |
| 132–135 |  | Ctrl_AxC |  | Ctrl_AxC |  | ... |  |
| 136 |  | Reserved |  | Reserved |  | ... |  |
| ... | ... | ... | ... | ... | ... | ... | ... |
| 143 |  | Reserved |  | Reserved |  | ... |  |
| 144–191 |  | VS&FCM |  | VS&FCM |  | ... |  |
| 192 |  | BFN |  | Reserved |  | ... |  |
| 193 |  | SlowC&M |  | SlowC&M |  | ... |  |
| 194 |  | Pointer p |  | Reserved |  | ... |  |
| 195 |  | Reserved |  | Reserved |  | ... |  |
| 196–199 |  | Ctrl_AxC |  | Ctrl_AxC |  | ... |  |
| 200 |  | Reserved |  | Reserved |  | ... |  |
| ... | ... | ... | ... | ... | ... | ... | ... |
| 207 |  | Reserved |  | Reserved |  | ... |  |
| 208–255 |  | VS&FCM |  | VS&FCM |  | ... |  |

|  | Word 15 Byte 1 | Byte 2 |
|---|---|---|
| Word 0 | SyncByte | SyncByte |
| | SlowC&M | SlowC&M |
| | Version | Reserved |
| | Reserved | Reserved |
| | Ctrl_AxC | Ctrl_AxC |
| | Reserved | Reserved |
| | ... | ... |
| | Reserved | Reserved |
| | VS&FCM | VS&FCM |
| | HFN | Reserved |
| | SlowC&M | SlowC&M |
| | StartUp | Reserved |
| | Reserved | Reserved |
| | Ctrl_AxC | Ctrl_AxC |
| | Reserved | Reserved |
| | ... | ... |
| | Reserved | Reserved |
| | VS&FCM | VS&FCM |
| | BFN | Reserved |
| | SlowC&M | SlowC&M |
| | L1 Signal | Reserved |
| | Reserved | Reserved |
| | Ctrl_AxC | Ctrl_AxC |
| | Reserved | Reserved |
| | ... | ... |
| | Reserved | Reserved |
| | VS&FCM | VS&FCM |
| | BFN | Reserved |
| | SlowC&M | SlowC&M |
| | Pointer p | Reserved |
| | Reserved | Reserved |
| | Ctrl_AxC | Ctrl_AxC |
| | Reserved | Reserved |
| | ... | ... |
| | Reserved | Reserved |
| | VS&FCM | VS&FCM |

CONT. FROM FIG. 7B

FIG. 7C

|  | Word 15 | Slot 1<br>Byte 1 | Slot 2<br>Byte 2 | Slot 3<br>Byte 3 | Slot 4<br>Byte 4 | Slot 5<br>Byte 5 | ... | Slot 16<br>Byte 16 |
|---|---|---|---|---|---|---|---|---|
| Word 0 | | | | | | | | |
| 0 | | SyncByte | SyncByte | SyncByte | SyncByte | SyncByte | ... | SyncByte |
| 1 | | | SlowC&M | SlowC&M | SlowC&M | | ... | |
| 2 | | | Version | Version | Reserved | | ... | |
| 3 | | GID | TPID | NPID | Reserved | Reserved | ... | Reserved |
| 4–7 | | | Ctrl_AxC | Ctrl_AxC | Ctrl_AxC | | ... | |
| 8 | | | Reserved | Reserved | Reserved | | ... | |
| ... | | ... | ... | ... | ... | ... | ... | ... |
| 15 | | | Reserved | Reserved | Reserved | | ... | |
| 16–63 | | | VS&FCM | VS&FCM | VS&FCM | | ... | |
| 64 | | | HFN | HFN | Reserved | | ... | |
| 65 | | | SlowC&M | SlowC&M | SlowC&M | | ... | |
| 66 | | | StartUp | StartUp | Reserved | | ... | |
| 67 | | VID = 0 | VID = 5 | VID = 3 | VID = 5 | VID = 0 | ... | VID = 0 |
| 68–71 | | | Ctrl_AxC | Ctrl_AxC | Ctrl_AxC | | ... | |
| 72 | | | Reserved | Reserved | Reserved | | ... | |
| ... | | ... | ... | ... | ... | ... | ... | ... |
| 79 | | | Reserved | Reserved | Reserved | | ... | |
| 80–127 | | | VS&FCM | VS&FCM | VS&FCM | | ... | |
| 128 | | | BFN | BFN | Reserved | | ... | |
| 129 | | | SlowC&M | SlowC&M | SlowC&M | | ... | |
| 130 | | | L1 Signal | L1 Signal | Reserved | | ... | |
| 131 | | | Reserved | Reserved | Reserved | | ... | |
| 132–135 | | | Ctrl_AxC | Ctrl_AxC | Ctrl_AxC | | ... | |
| 136 | | | Reserved | Reserved | Reserved | | ... | |
| ... | | ... | ... | ... | ... | ... | ... | ... |
| 143 | | | Reserved | Reserved | Reserved | | ... | |
| 144–191 | | | VS&FCM | VS&FCM | VS&FCM | | ... | |
| 192 | | | BFN | BFN | Reserved | | ... | |
| 193 | | | SlowC&M | SlowC&M | SlowC&M | | ... | |
| 194 | | | Pointer p | Pointer p | Reserved | | ... | |
| 195 | | | Reserved | Reserved | Reserved | | ... | |
| 196–199 | | | Ctrl_AxC | Ctrl_AxC | Ctrl_AxC | | ... | |
| 200 | | | Reserved | Reserved | Reserved | | ... | |
| ... | | ... | ... | ... | ... | ... | ... | ... |
| 207 | | | Reserved | Reserved | Reserved | | ... | |
| 208–255 | | | VS&FCM | VS&FCM | VS&FCM | | ... | |

|  | Slot 1<br>Byte 1 | Slot 2<br>Byte 2 | Slot 3<br>Byte 3 | Slot 4<br>Byte 4 | Slot 5<br>Byte 5 | ... | Slot 16<br>Byte 16 |
|---|---|---|---|---|---|---|---|
| | SyncByte | SyncByte | SyncByte | SyncByte | SyncByte | ... | SyncByte |
| | | SlowC&M | SlowC&M | SlowC&M | | ... | |
| | | Version | Version | Reserved | | ... | |
| | GID | TPID | NPID | Reserved | Reserved | ... | Reserved |
| | | Ctrl_AxC | Ctrl_AxC | Ctrl_AxC | | ... | |
| | | Reserved | Reserved | Reserved | | ... | |
| | ... | ... | ... | ... | ... | ... | ... |
| | | Reserved | Reserved | Reserved | | ... | |
| | | VS&FCM | VS&FCM | VS&FCM | | ... | |
| | | HFN | HFN | Reserved | | ... | |
| | | SlowC&M | SlowC&M | SlowC&M | | ... | |
| | | StartUp | StartUp | Reserved | | ... | |
| | VID = 0 | VID = 5 | VID = 3 | VID = 3 | VID = 0 | ... | VID = 0 |
| | | Ctrl_AxC | Ctrl_AxC | Ctrl_AxC | | ... | |
| | | Reserved | Reserved | Reserved | | ... | |
| | | ... | ... | ... | | ... | ... |
| | | Reserved | Reserved | Reserved | | ... | |
| | | VS&FCM | VS&FCM | VS&FCM | | ... | |
| | | BFN | BFN | Reserved | | ... | |
| | | SlowC&M | SlowC&M | SlowC&M | | ... | |
| | | L1 Signal | L1 Signal | Reserved | | ... | |
| | | Reserved | Reserved | Reserved | | ... | |
| | | Ctrl_AxC | Ctrl_AxC | Ctrl_AxC | | ... | |
| | | Reserved | Reserved | Reserved | | ... | |
| | | ... | ... | ... | | ... | ... |
| | | Reserved | Reserved | Reserved | | ... | |
| | | VS&FCM | VS&FCM | VS&FCM | | ... | |
| | | BFN | BFN | Reserved | | ... | |
| | | SlowC&M | SlowC&M | SlowC&M | | ... | |
| | | Pointer p | Pointer p | Reserved | | ... | |
| | | Reserved | Reserved | Reserved | | ... | |
| | | Ctrl_AxC | Ctrl_AxC | Ctrl_AxC | | ... | |
| | | Reserved | Reserved | Reserved | | ... | |
| | | ... | ... | ... | | ... | ... |
| | | Reserved | Reserved | Reserved | | ... | |
| | | VS&FCM | VS&FCM | VS&FCM | | ... | |

CONT. FROM FIG. 8A

FIG. 8B

|  | Word 15 Word 0 | Slot 1 Byte 1 | Slot 2 Byte 2 | Slot 3 Byte 3 | Slot 4 Byte 4 | Slot 5 Byte 5 | ... | Slot 16 Byte 16 |
|---|---|---|---|---|---|---|---|---|
| 0 | | SyncByte | SyncByte | SyncByte | SyncByte | SyncByte | ... | SyncByte |
| 1 | | | SlowC&M | | | | ... | |
| 2 | | | Version | | | | ... | |
| 3 | | GID = A | TPID = 5 | NPID = 3 | | | ... | |
| 4–7 | | | Ctrl_AxC | | | | ... | |
| 8 | | | Reserved | | | | ... | |
| ... | | ... | ... | ... | ... | ... | ... | ... |
| 15 | | | Reserved | | | | ... | |
| 16–63 | | | VS&FCM | | | | ... | |
| 64 | | | HFN | | | | ... | |
| 65 | | | SlowC&M | | | | ... | |
| 66 | | | StartUp | | | | ... | |
| 67 | | VID = b | VID = a | VID = b | VID = 0 | VID = 0 | ... | VID = 0 |
| 68–71 | | | Ctrl_AxC | | | | ... | |
| 72 | | | Reserved | | | | ... | |
| ... | | | ... | | | | ... | ... |
| 79 | | | Reserved | | | | ... | |
| 80–127 | | | VS&FCM | | | | ... | |
| 128 | | | BFN | | | | ... | |
| 129 | | | SlowC&M | | | | ... | |
| 130 | | | L1 Signal | | | | ... | |
| 131 | | | Reserved | | | | ... | |
| 132–135 | | | Ctrl_AxC | | | | ... | |
| 136 | | | Reserved | | | | ... | |
| ... | | | ... | | | | ... | ... |
| 143 | | | Reserved | | | | ... | |
| 144–191 | | | VS&FCM | | | | ... | |
| 192 | | | BFN | | | | ... | |
| 193 | | | SlowC&M | | | | ... | |
| 194 | | | Pointer p | | | | ... | |
| 195 | | | Reserved | | | | ... | |
| 196–199 | | | Ctrl_AxC | | | | ... | |
| 200 | | | Reserved | | | | ... | |
| ... | | | ... | | | | ... | ... |
| 207 | | | Reserved | | | | ... | |
| 208–255 | | | VS&FCM | | | | ... | |

|  | Slot 1 Byte 1 | Slot 2 Byte 2 | Slot 3 Byte 3 | Slot 4 Byte 4 | Slot 5 Byte 5 | ... | Slot 16 Byte 16 |
|---|---|---|---|---|---|---|---|
| Word 0 | SyncByte | SyncByte | SyncByte | SyncByte | SyncByte | ... | SyncByte |
|  |  |  |  | SlowC&M |  | ... |  |
|  |  |  |  | Reserved |  | ... |  |
|  | GID = A | TPID = 3 | NPID = Null | Reserved |  | ... |  |
|  |  |  |  | Ctrl_AxC |  | ... |  |
|  |  |  |  | Reserved |  | ... |  |
|  | ... | ... | ... | ... | ... | ... | ... |
|  |  |  |  | Reserved |  | ... |  |
|  |  |  |  | VS&FCM |  | ... |  |
|  |  |  |  | Reserved |  | ... |  |
|  |  |  |  | SlowC&M |  | ... |  |
|  |  |  |  | Reserved |  | ... |  |
|  | VID = 0 | VID = 0 | VID = 0 | VID = a | VID = 0 | ... | VID = 0 |
|  |  |  |  | Ctrl_AxC |  | ... |  |
|  |  |  |  | Reserved |  | ... |  |
|  |  |  |  | ... |  | ... | ... |
|  |  |  |  | Reserved |  | ... |  |
|  |  |  |  | VS&FCM |  | ... |  |
|  |  |  |  | Reserved |  | ... |  |
|  |  |  |  | SlowC&M |  | ... |  |
|  |  |  |  | Reserved |  | ... |  |
|  |  |  |  | Reserved |  | ... |  |
|  |  |  |  | Ctrl_AxC |  | ... |  |
|  |  |  |  | Reserved |  | ... |  |
|  |  |  |  | ... |  | ... | ... |
|  |  |  |  | Reserved |  | ... |  |
|  |  |  |  | VS&FCM |  | ... |  |
|  |  |  |  | Reserved |  | ... |  |
|  |  |  |  | SlowC&M |  | ... |  |
|  |  |  |  | Reserved |  | ... |  |
|  |  |  |  | Reserved |  | ... |  |
|  |  |  |  | Ctrl_AxC |  | ... |  |
|  |  |  |  | Reserved |  | ... |  |
|  |  |  |  | ... |  | ... | ... |
|  |  |  |  | Reserved |  | ... |  |
| Word 15 |  |  |  | VS&FCM |  | ... |  |

FIG. 10B

| | Word 15 | Slot 1<br>Byte 1 | Slot 2<br>Byte 2 | Slot 3<br>Byte 3 | Slot 4<br>Byte 4 | Slot 5<br>Byte 5 | ... | Slot 16<br>Byte 16 |
|---|---|---|---|---|---|---|---|---|
| Word 0 | | SyncByte | SyncByte | SyncByte | SyncByte | SyncByte | ... | SyncByte | Reserved |
| | | Reserved | Reserved | Reserved | Reserved | Reserved | ... | Reserved | |
| 0 | | | | | | | ... | |
| 1 | | | | | | | ... | |
| 2 | | | | | | | ... | |
| 3 | | | | | | | ... | |
| 4–7 | | | | | | | ... | |
| 8 | | | | | | | ... | |
| ... | | ... | ... | ... | ... | ... | ... | ... |
| 15 | | | | | | | ... | |
| 16–63 | | | | | | | ... | |
| | | GID = A | TPID=2 | NPID4 | Reserved | Reserved | ... | Reserved | Reserved |
| | | VID = 0 | VID = 0 | VID = 0 | VID = 0 | VID = 0 | ... | VID = 0 | |
| 64 | | | | | | | ... | |
| 65 | | | | | | | ... | |
| 66 | | | | | | | ... | |
| 67 | | | | | | | ... | |
| 68–71 | | | | | | | ... | |
| 72 | | | | | | | ... | |
| ... | | | | | | | ... | ... |
| 79 | | | | | | | ... | |
| 80–127 | | | | | | | ... | |
| | | Signaling and Negotiate (Port Individual) byte (01:16) x 16 ||||||
| | | Signaling and Negotiate (Port Individual) byte (17:32) x 16 ||||||
| 128 | | | | | | | ... | |
| 129 | | | | | | | ... | |
| 130 | | | | | | | ... | |
| 131 | | | | | | | ... | |
| 132–135 | | | | | | | ... | |
| 136 | | | | | | | ... | |
| ... | | | | | | | ... | ... |
| 143 | | | | | | | ... | |
| 144–191 | | | | | | | ... | |
| | | Signaling and Negotiate (Multi Port aggregated) byte (01:16) x16 ||||||
| | | Signaling and Negotiate (Multi Port aggregated) byte (33:48) x16 ||||||
| 192 | | | | | | | ... | |
| 193 | | | | | | | ... | |
| 194 | | | | | | | ... | |
| 195 | | | | | | | ... | |
| 196~199 | | | | | | | ... | |
| 200 | | | | | | | ... | |
| ... | | | | | | | ... | ... |
| 207 | | | | | | | ... | |
| 208~255 | | | | | | | ... | |

DATA FRAME TRANSMISSION METHOD AND APPARATUS FOR VIRTUAL ELASTIC CPRI INTERFACE

CROSS-REFERENCE TO RELATED APPLICATIONS

This application is a continuation of International Patent Application No. PCT/CN2016/087498 filed on Jun. 28, 2016, which claims priority to Chinese Patent Application No. 201510423562.1 filed on Jul. 17, 2015. The disclosures of the aforementioned applications are hereby incorporated by reference in their entireties.

TECHNICAL FIELD

The present disclosure relates to the field of network technologies, and in particular, to a data frame transmission method and apparatus for a virtual elastic Common Public Radio Interface (CPRI).

BACKGROUND

A Centralized Radio Access Network (C-RAN) divides a function of a base station, an Remote Radio Unit (RRU) reserves functions such as an antenna, a radio frequency power amplifier, and conversion between analog information and digital information, and a Baseband Processing Unit (BBU) processes a baseband signal such that efficiency of a functional component is improved, maintainability is improved, and operation and maintenance costs are reduced. The BBU and the RRU mainly use a CPRI physical interface to carry and transmit in-phase/quadrature phase (IQ) data, and bandwidth of a payload area of the CPRI physical interface needs to be not less than bandwidth of IQ data that needs to be supported.

However, actually a load rate of an air interface service continuously changes. For example, there is a large amount of access data of a radio access network base station in a downtown in the daytime, there are many operating carriers, and service load decreases in the evening. A case in an uptown is the opposite. The CPRI physical interface is a static Time Division Multiplexing (TDM) pipeline, several single-carrier single-antenna IQ data areas are divided on the CPRI physical interface, and different single-carrier single-antenna IQ data areas have different working modes and carrier frequency bandwidth. A mapping status of the CPRI physical interface is closed and invisible to a bearer network. Therefore, when the IQ data on the CPRI physical interface is carried on the bearer network, regardless of an amount of the IQ data carried on the CPRI physical interface, the IQ data on the CPRI physical interface needs to be transmitted as a whole on the bearer network, thereby causing unnecessary waste in bandwidth. In addition, if the IQ data is carried using an Ethernet packet network that has a statistics multiplexing characteristic, the Ethernet needs to have a strong transmission quality control capability to provide low delay and low jitter transmission performance that is approximate to a TDM connection. An implementation technology is difficult to use, processing is complex, and availability is poor.

SUMMARY

Embodiments of the present disclosure provide a data frame transmission method and apparatus for a virtual elastic CPRI. Network bandwidth utilization can be improved.

A first aspect of the present disclosure provides a data frame transmission method for a virtual elastic CPRI, including constructing a super frame of a virtual elastic CPRI, where the super frame of the virtual elastic CPRI is a data frame of a CPRI physical interface that is equivalent to N times of a reference rate, and N is a positive integer, dividing a frame structure of a physical interface into multiple timeslots, where bandwidth of the timeslots is not less than the reference rate, placing the super frame of the virtual elastic CPRI into at least one timeslot of the multiple timeslots in the frame structure of the physical interface to obtain a new data frame, and sending the new data frame to a receive end using the physical interface.

With reference to the first aspect, in a first possible implementation of the first aspect, the physical interface includes the CPRI physical interface, and dividing a frame structure of a physical interface into multiple timeslots includes dividing a frame structure except a first synchronization byte of a super frame of the CPRI physical interface into multiple timeslots according to a quantity of bytes of each word in the super frame, where the first synchronization byte is a first word of a first basic frame of multiple basic frames in the super frame of the CPRI physical interface.

With reference to the first possible implementation of the first aspect, in a second possible implementation of the first aspect, placing the super frame of the virtual elastic CPRI into at least one timeslot of the multiple timeslots in the frame structure of the physical interface to obtain a new data frame includes placing another byte other than a second synchronization byte in the super frame of the virtual elastic CPRI into at least one timeslot of the multiple timeslots in the frame structure of the super frame of the CPRI physical interface to obtain a new data frame, where the second synchronization byte is a first word of a first basic frame of multiple basic frames in the super frame of the virtual elastic CPRI.

With reference to the first aspect, in a third possible implementation of the first aspect, the physical interface includes an Ethernet physical interface, and dividing a frame structure of a physical interface into multiple timeslots includes dividing, per byte, a frame structure except a frame overhead and a synchronization header in one frame period of the Ethernet physical interface into multiple timeslots that alternate at intervals.

With reference to the third possible implementation of the first aspect, in a fourth possible implementation of the first aspect, placing the super frame of the virtual elastic CPRI into at least one timeslot of the multiple timeslots in the frame structure of the physical interface to obtain a new data frame includes placing the super frame of the virtual elastic CPRI into at least one timeslot of the multiple timeslots that alternate at intervals in the frame structure in one frame period of the Ethernet physical interface.

With reference to the first aspect, in a fifth possible implementation of the first aspect, placing the super frame of the virtual elastic CPRI into at least one timeslot of the multiple timeslots in the frame structure of the physical interface to obtain a new data frame includes placing, according to a byte arrangement sequence in the super frame of the virtual elastic CPRI, the super frame of the virtual elastic CPRI into the at least one timeslot of the multiple timeslots in the frame structure of the physical interface to obtain the new data frame.

With reference to the first aspect, in a sixth possible implementation of the first aspect, after placing the super frame of the virtual elastic CPRI into at least one timeslot of the multiple timeslots in the frame structure of the physical interface to obtain a new data frame, the method further includes labeling at least one timeslot in the new data frame using an interface identifier (ID) to represent that the at least one timeslot is used to carry the super frame of the virtual elastic CPRI.

With reference to the sixth possible implementation of the first aspect, in a seventh possible implementation of the first aspect, after labeling at least one timeslot in the new data frame using an interface ID, the method further includes adjusting a quantity of the interface IDs corresponding to the at least one timeslot to change a quantity of the multiple timeslots occupied by the super frame of the virtual elastic CPRI.

With reference to the seventh possible implementation of the first aspect, in an eighth possible implementation of the first aspect, adjusting a quantity of the interface IDs corresponding to the at least one timeslot includes labeling a target timeslot except the at least one timeslot of multiple timeslots in the new data frame using the interface ID, and adding the target timeslot to a next data frame of the new data frame so as to carry the super frame of the virtual elastic CPRI.

With reference to the first aspect, in a ninth possible implementation of the first aspect, the physical interface includes a first physical interface and a second physical interface, and after placing the super frame of the virtual elastic CPRI into at least one timeslot of the multiple timeslots in the frame structure of the physical interface to obtain a new data frame, the method further includes performing labeling in a control word of a first basic frame of the new data frame by separately using an interface label of the first physical interface and an interface label of the second physical interface that is cascaded with the first physical interface to represent a cascading relationship between the multiple physical interfaces, where the control word is the first word of the basic frame.

With reference to the ninth possible implementation of the first aspect, in a tenth possible implementation of the first aspect, after placing the super frame of the virtual elastic CPRI into at least one timeslot of the multiple timeslots in the frame structure of the physical interface to obtain a new data frame, the method further includes performing labeling in the control word of the first basic frame using a group ID (GID) to represent that all the multiple cascaded physical interfaces are configured to carry the super frame of the virtual elastic CPRI.

With reference to the first aspect, or the first to the tenth possible implementations of the first aspect, in an eleventh possible implementation of the first aspect, the method further includes setting a control word of a second basic frame of the new data frame as a protocol channel for negotiating a mapping relationship with the receive end, or adding a third basic frame to the new data frame and using another word in the third basic frame except the control word as a protocol channel for negotiating a mapping relationship with the receive end, where the mapping relationship is an arrangement relationship of placing the super frame of the virtual elastic CPRI into the at least one timeslot of the multiple timeslots in the frame structure of the physical interface.

Correspondingly, a second aspect of the present disclosure provides a data frame transmission apparatus for a virtual elastic CPRI, including a super frame construction module configured to construct a super frame of a virtual elastic CPRI, where the super frame of the virtual elastic CPRI is a data frame of a CPRI physical interface that is equivalent to N times of a reference rate, and N is a positive integer, a timeslot division module configured to divide a frame structure of a physical interface into multiple timeslots, where bandwidth of the timeslots is not less than the reference rate, a super frame placing module configured to place the super frame of the virtual elastic CPRI into at least one timeslot of the multiple timeslots in the frame structure of the physical interface to obtain a new data frame, and a data frame transmission module configured to send the new data frame to a receive end using the physical interface.

With reference to the second aspect, in a first possible implementation of the second aspect, the physical interface includes the CPRI physical interface, and the timeslot division module is further configured to divide a frame structure except a first synchronization byte of a super frame of the CPRI physical interface into multiple timeslots according to a quantity of bytes of each word in the super frame, where the first synchronization byte is a first word of a first basic frame of multiple basic frames in the super frame of the CPRI physical interface.

With reference to the first possible implementation of the second aspect, in a second possible implementation of the second aspect, the super frame placing module is further configured to place another byte other than a second synchronization byte in the super frame of the virtual elastic CPRI into at least one timeslot of the multiple timeslots in the frame structure of the super frame of the CPRI physical interface to obtain a new data frame, where the second synchronization byte is a first word of a first basic frame of multiple basic frames in the super frame of the virtual elastic CPRI.

With reference to the second aspect, in a third possible implementation of the second aspect, the physical interface includes an Ethernet physical interface, and the timeslot division module is further configured to divide, per byte, a frame structure except a frame overhead and a synchronization header in one frame period of the Ethernet physical interface into multiple timeslots that alternate at intervals.

With reference to the third possible implementation of the second aspect, in a fourth possible implementation of the second aspect, the super frame placing module is further configured to place the super frame of the virtual elastic CPRI into at least one timeslot of the multiple timeslots that alternate at intervals in the frame structure in one frame period of the Ethernet physical interface.

With reference to the second aspect, in a fifth possible implementation of the second aspect, the super frame placing module is further configured to place, according to a byte arrangement sequence in the super frame of the virtual elastic CPRI, the super frame of the virtual elastic CPRI into the at least one timeslot of the multiple timeslots in the frame structure of the physical interface to obtain the new data frame.

With reference to the second aspect, in a sixth possible implementation of the second aspect, the super frame placing module is further configured to label at least one timeslot in the new data frame using an interface ID to represent that the at least one timeslot is used to carry the super frame of the virtual elastic CPRI.

With reference to the sixth possible implementation of the second aspect, in a seventh possible implementation of the second aspect, the super frame placing module is further configured to adjust a quantity of the interface IDs corresponding to the at least one timeslot to change a quantity of the multiple timeslots occupied by the super frame of the virtual elastic CPRI.

With reference to the seventh possible implementation of the second aspect, in an eighth possible implementation of the second aspect, the super frame placing module is further configured to label a target timeslot except the at least one timeslot of multiple timeslots in the new data frame using the interface ID, and add the target timeslot to a next data frame of the new data frame so as to carry the super frame of the virtual elastic CPRI.

With reference to the second aspect, in a ninth possible implementation of the second aspect, the physical interface includes a first physical interface and a second physical interface, and the super frame placing module is further configured to perform labeling in a control word of a first basic frame of the new data frame by separately using an interface label of the first physical interface and an interface label of the second physical interface that is cascaded with the first physical interface to represent a cascading relationship between the multiple physical interfaces, where the control word is the first word of the basic frame.

With reference to the ninth possible implementation of the second aspect, in a tenth possible implementation of the second aspect, the super frame placing module is further configured to perform labeling in the control word of the first basic frame using a GID to represent that all the multiple cascaded physical interfaces are configured to carry the super frame of the virtual elastic CPRI.

With reference to the second aspect, or the first to the tenth possible implementations of the second aspect, in an eleventh possible implementation of the second aspect, the super frame placing module is further configured to set a control word of a second basic frame of the new data frame as a protocol channel for negotiating a mapping relationship with the receive end, or add a third basic frame to the new data frame and use another word in the third basic frame except the control word as a protocol channel for negotiating a mapping relationship with the receive end, where the mapping relationship is an arrangement relationship of placing the super frame of the virtual elastic CPRI into the at least one timeslot of the multiple timeslots in the frame structure of the physical interface.

Correspondingly, a third aspect of the present disclosure provides a data frame transmission apparatus for a virtual elastic CPRI, where the apparatus includes a network interface, a memory, and a processor, the memory stores a group of program code, and the processor is configured to invoke the program code stored in the memory to perform the operations of constructing a super frame of a virtual elastic CPRI, where the super frame of the virtual elastic CPRI is a data frame of a CPRI physical interface that is equivalent to N times of a reference rate, and N is a positive integer, dividing a frame structure of a physical interface into multiple timeslots, where bandwidth of the timeslots is not less than the reference rate, placing the super frame of the virtual elastic CPRI into at least one timeslot of the multiple timeslots in the frame structure of the physical interface to obtain a new data frame, and sending the new data frame to a receive end using the physical interface.

To implement the embodiments of the present disclosure, first, a super frame of a virtual elastic CPRI is constructed, where the super frame of the virtual elastic CPRI is a data frame of a CPRI physical interface that is equivalent to N times of a reference rate. Then a frame structure of a physical interface is divided into multiple timeslots, where bandwidth of the timeslots is not less than the reference rate. Then the super frame of the virtual elastic CPRI is placed into at least one timeslot of the multiple timeslots in the frame structure of the physical interface to obtain a new data frame, and finally, the new data frame is sent to a receive end using the physical interface. Therefore, network bandwidth utilization is improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

FIG. 2A and FIG. 2B are a schematic structural diagram of a synchronization byte in a super frame according to an embodiment of the present disclosure;

FIG. 3A, FIG. 3B and FIG. 3C are schematic structural diagrams of a first data frame according to an embodiment of the present disclosure;

FIG. 7A, FIG. 7B, and FIG. 7C are a schematic structural diagram of a fourth data frame according to an embodiment of the present disclosure;

FIG. 8A and FIG. 8B are a schematic structural diagram of a fifth data frame according to an embodiment of the present disclosure;

FIG. 10A, FIG. 10B, and FIG. 10C are a schematic structural diagram of a sixth data frame according to an embodiment of the present disclosure;

FIG. 11A, FIG. 11B, and FIG. 11C are a schematic structural diagram of a seventh data frame according to an embodiment of the present disclosure;

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
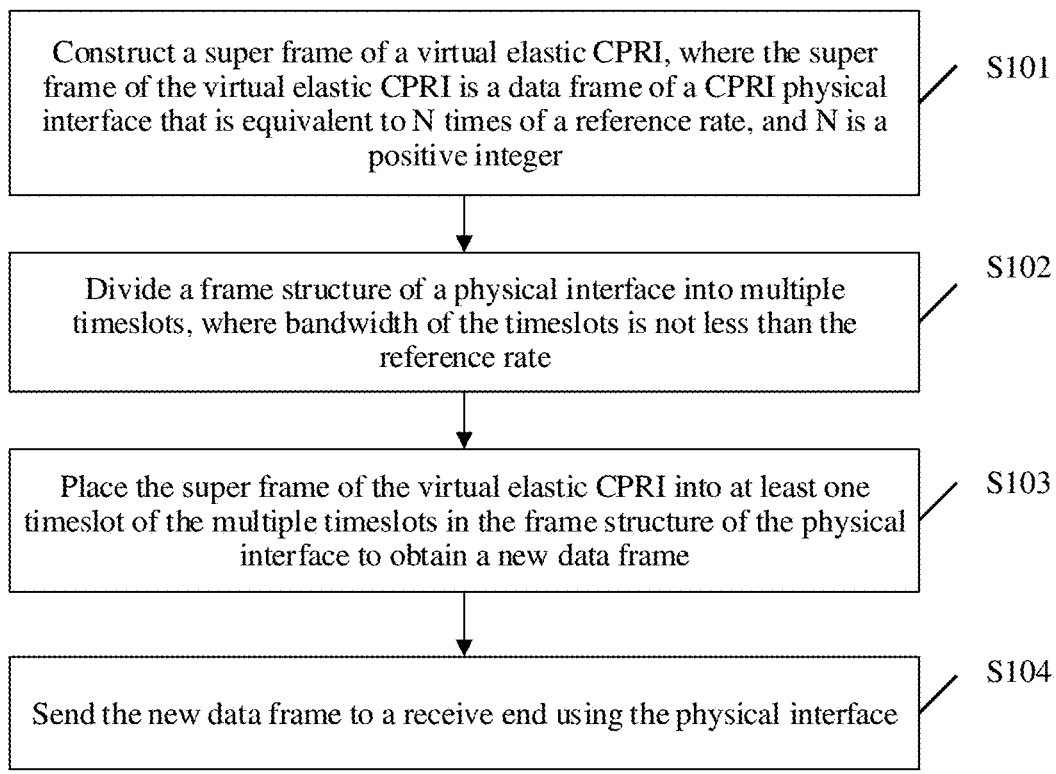
FIG. 1 is a flowchart of a first embodiment of a data frame transmission method for a virtual elastic CPRI according to the present disclosure.

Referring to FIG. 1, FIG. 1 is a flowchart of a first embodiment of a data frame transmission method for a virtual elastic CPRI according to the present disclosure. As shown in the figure, the method in this embodiment of the present disclosure includes the following steps.

Step S101: Construct a super frame of a virtual elastic CPRI, where the super frame of the virtual elastic CPRI is a data frame of a CPRI physical interface that is equivalent to N times of a reference rate, and N is a positive integer.

Figure 2B:

In specific implementation, a data frame in a 10 millisecond (ms) frame period of the CPRI physical interface includes 150 super frames, each super frame includes 256 basic frames, and a rate of the basic frame is 3840000 frames per second (fps) (150×256/10 ms=3.84 megaframes per second (Mfps)). Each basic frame includes 16 words, each word includes N bytes, and a quantity N of bytes of each word is related to a rate option of the CPRI physical interface. As shown in FIG. 2A and FIG. 2B, one time of the reference rate is 491.52 megabits per second (Mbps)×1, and one word includes one byte, two times of the reference rate is 491.52 Mbps×2, and one word includes two bytes, four times of the reference rate is 491.52 Mbps×4, and one word includes four bytes, and so on. Each basic frame includes one control word and 15 data words. The first word of the basic frame is the control word, the control word is used for interface control and an overhead, other words in the basic frame are the data words, and the data words are used to divide multiple single-carrier single-antenna IQ data areas to carry IQ data. A control word of the first basic frame in the super frame is a synchronization byte of the super frame, and for different rate options, composition of the synchronization byte is different. For example, an ×1 rate option uses 8B/10B encoding and uses a character 0×BC as a synchronization byte [#Z.0.0], an ×20 rate option uses 64B/66B encoding, synchronization bytes [#Z.0.0-#Z.0.19] have 20 bytes, and except that [#Z.0.7] is 0×FD, an end character in the 64B/66B encoding is defined as/T/, [#Z.0.8]=0×FD, and a start character in the 64B/66B encoding is defined as/S/, all other characters are padding characters 0×50.

Based on a frame structure of the foregoing super frame, the data frame of the CPRI physical interface that is equivalent to N times of the reference rate may be constructed. A data frame shown in FIG. 3C is a constructed super frame of a virtual elastic CPRI that is two times of the reference rate. The super frame includes 256 basic frames, each basic frame includes 16 words, each word includes two bytes, the first byte of the basic frame is a control word, the first word of the first basic frame in the super frame is a synchronization byte, and the super frame has two times of the reference rate.

Figure 4A:
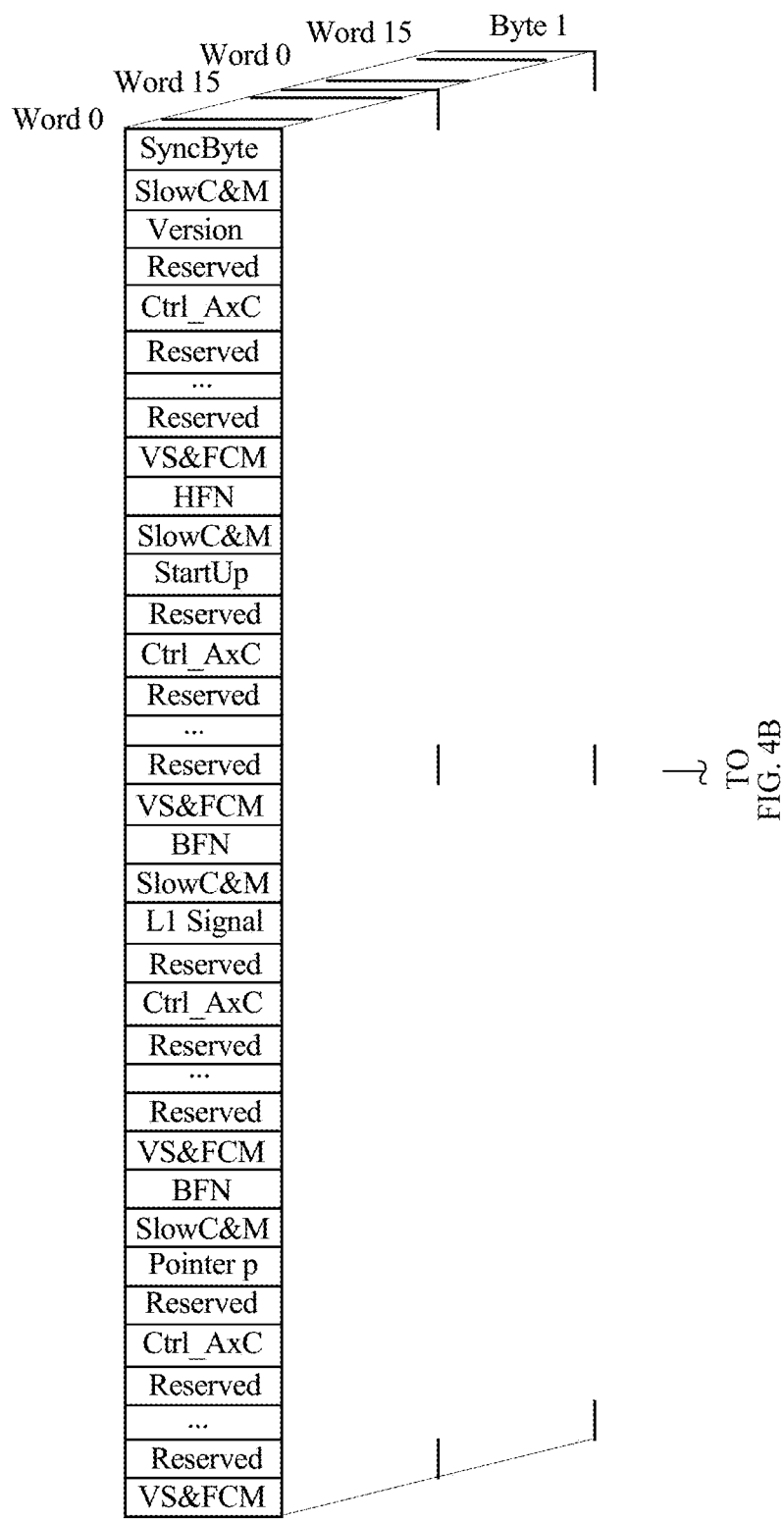
FIG. 4A and FIG. 4B are schematic structural diagrams of a second data frame according to an embodiment of the present disclosure.
Figure 4B:
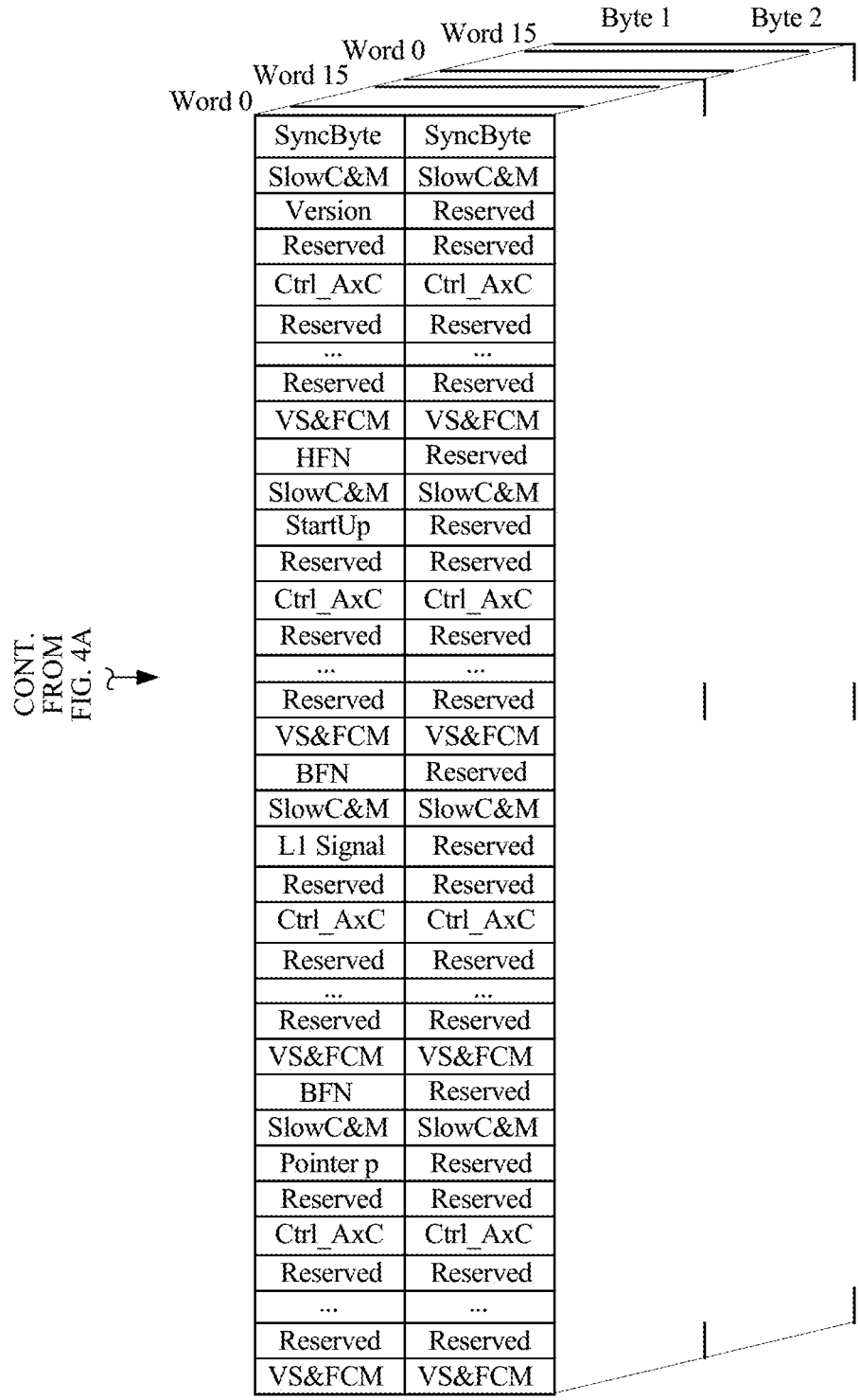

Optionally, super frames of multiple CPRI physical interfaces that are equivalent to N times of the reference rate may be sequentially arranged in a word extension sequence to construct a data frame of the virtual elastic CPRI. A data frame shown in FIG. 4A is a super frame that is of a virtual elastic CPRI and that is obtained by arranging, in a byte sequence, super frames of two CPRI physical interfaces that are equivalent to one time of the reference rate, and a data frame in FIG. 4B is a super frame that is of a virtual elastic CPRI and that is obtained by arranging, in a byte sequence, super frames of two CPRI physical interfaces that are equivalent to two times of the reference rate.

Step S102: Divide a frame structure of a physical interface into multiple timeslots, where bandwidth of the timeslots is not less than the reference rate.

Figure 3B:
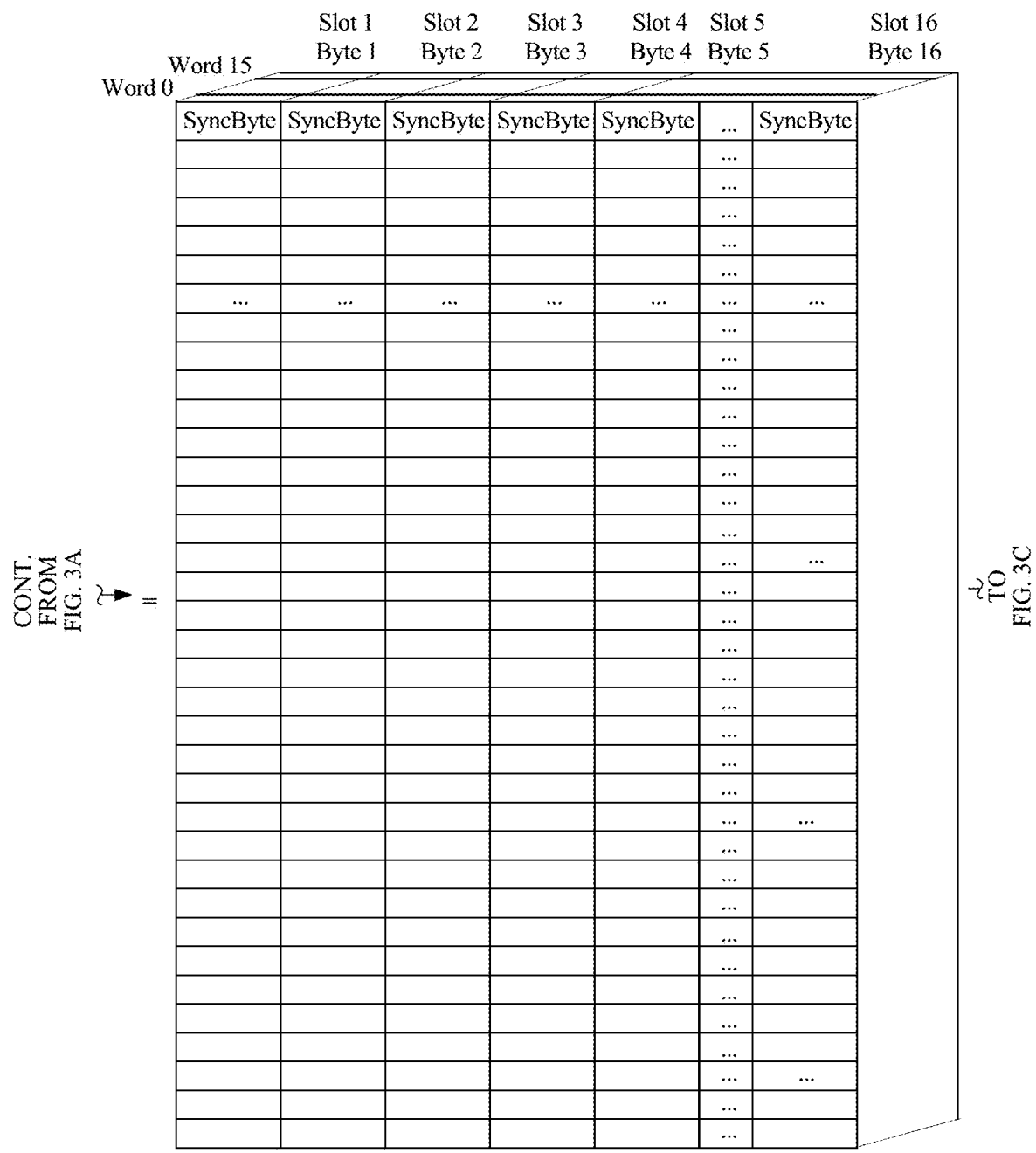

In specific implementation, the physical interface includes the CPRI physical interface, and bandwidth of a timeslot of the CPRI physical interface may be 491.52 Mbps. A frame structure except a first synchronization byte of the super frame of the CPRI physical interface may be divided into multiple timeslots according to a quantity of bytes of each word in the super frame, where the first synchronization byte is the first word of the first basic frame of multiple basic frames in the super frame of the CPRI physical interface. Because a synchronization byte of the super frame of the virtual elastic CPRI is a fixed pattern and may be restored at a receive end according to an inherent pattern, the first synchronization byte of the frame structure of the CPRI physical interface may be reserved. A frame structure shown in FIG. 3B is a super frame of a physical interface that is 16 times of the reference rate, and the frame structure except the first word of the first basic frame in the super frame is divided into 16 timeslots according to a quantity 16 of bytes of each word in the super frame.

Figure 5:
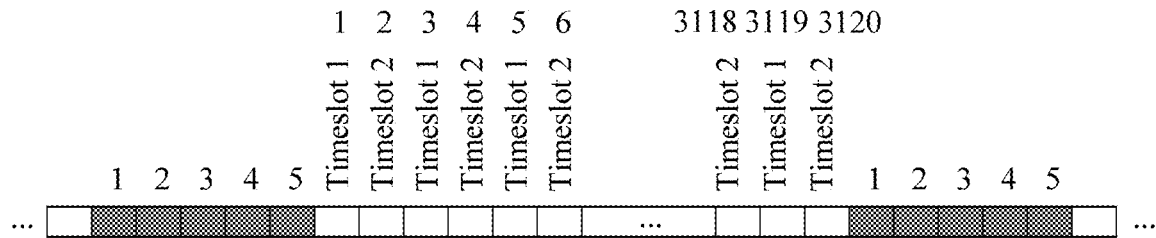
FIG. 5 is a schematic structural diagram of a third data frame according to an embodiment of the present disclosure.

Optionally, the physical interface includes an Ethernet physical interface, and bandwidth of a timeslot of the Ethernet physical interface may be 500 Mbps. A frame structure except a frame overhead and a synchronization header in one frame period of the Ethernet physical interface may be divided, per byte, into multiple timeslots that alternate at intervals. As shown in FIG. 5, the frame structure in one frame period includes 3125 bytes, the first five bytes are the frame overhead and the synchronization header, the remaining 3120 bytes are divided, per byte, into a timeslot 1 and a timeslot 2 that alternate at intervals, and each timeslot is 3120/2=1560 bytes.

Step S103: Place the super frame of the virtual elastic CPRI into at least one timeslot of the multiple timeslots in the frame structure of the physical interface to obtain a new data frame.

In specific implementation, the super frame of the virtual elastic CPRI may be placed into the at least one timeslot of the multiple timeslots in the frame structure of the physical interface according to a byte arrangement sequence in the super frame of the virtual elastic CPRI to obtain the new data frame. Another unused timeslot may be selectively filled with a byte of no information meaning, such as 0×00, 0×55, or another byte.

Optionally, the physical interface includes the CPRI physical interface, and another byte other than a second synchronization byte in the super frame of the virtual elastic CPRI may be placed into at least one timeslot of the multiple timeslots in the frame structure of the super frame of the CPRI physical interface to obtain a new data frame. The second synchronization byte is the first word of the first basic frame of multiple basic frames in the super frame of the virtual elastic CPRI. A frame structure shown in FIG. 3A is a new data frame obtained by placing another byte other than the second synchronization byte in the super frame of the virtual elastic CPRI into the second timeslot and the fourth timeslot in the frame structure of the super frame of the CPRI physical interface.

Optionally, the physical interface includes the Ethernet physical interface, and the super frame of the virtual elastic CPRI may be placed into at least one timeslot of the multiple timeslots that alternate at intervals in the frame structure in one frame period of the Ethernet physical interface. As shown in FIG. 5, super frames (256×16×3=4096×3 bytes) of three virtual elastic CPRIs may be placed into locations of 1560×8 bytes of the timeslot of the Ethernet physical interface.

It should be noted that super frames of multiple virtual elastic CPRIs may be placed into multiple timeslots of a frame structure of one physical interface, a super frame of one virtual elastic CPRI may be simultaneously placed into multiple timeslots of frame structures of multiple physical interfaces, a super frame of one virtual elastic CPRI may be simultaneously placed into a timeslot of a frame structure of one physical interface, or super frames of multiple virtual elastic CPRIs are placed into multiple timeslots of frame structures of multiple physical interfaces in order to properly allocate a timeslot of a frame structure of a physical interface and improve network bandwidth utilization.

Step S104: Send the new data frame to a receive end using the physical interface.

In specific implementation, the new data frame may be sent to the receive end using the Ethernet physical interface or the CPRI physical interface. In addition, a control word of a second basic frame of the new data frame may be used as a protocol channel for negotiating a mapping relationship with the receive end, or a third basic frame is added to the new data frame and another word in the third basic frame except the control word is used as a protocol channel for negotiating a mapping relationship with the receive end. The mapping relationship is an arrangement relationship of placing the super frame of the virtual elastic CPRI into the at least one timeslot of the multiple timeslots in the frame structure of the physical interface. After receiving the new data frame, the receive end may transform the new data frame according to the agreed mapping relationship so as to obtain the super frame of the virtual elastic CPRI. It should be noted that the mapping relationship may also be negotiated by means of manual configuration or using a third party channel.

Figure 11B:
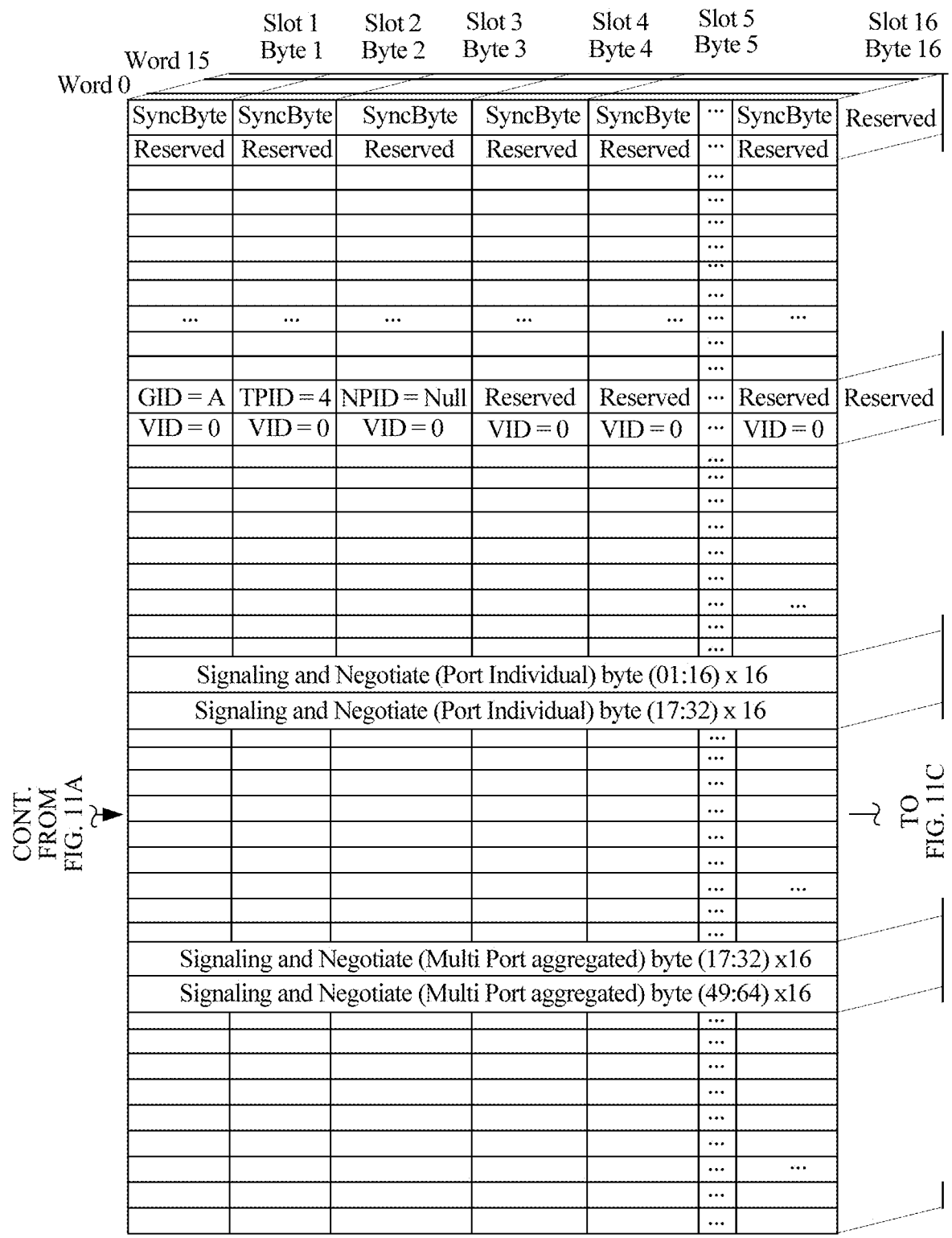
Figure 11C:
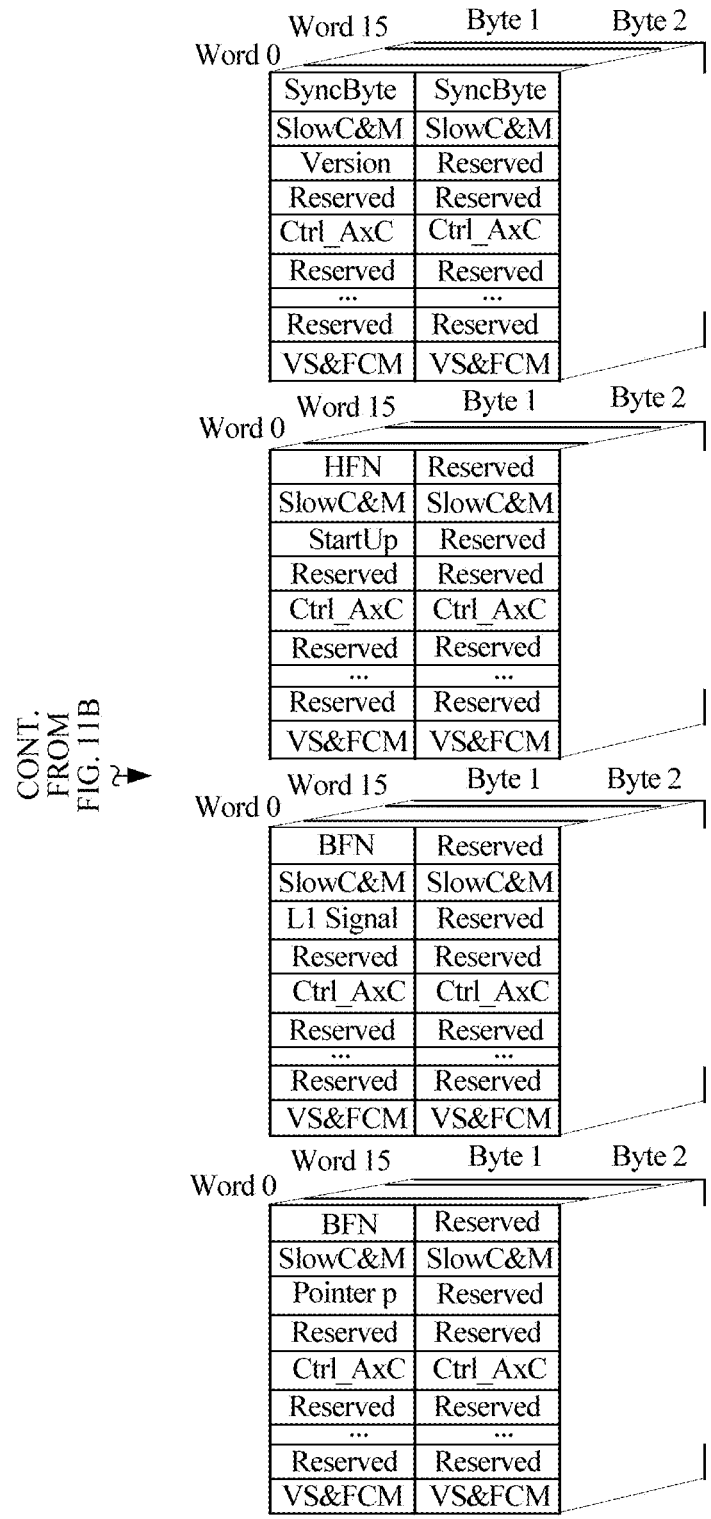

It should be noted that the bandwidth may be increased in a manner of increasing an overhead bearing area of the frame structure of the CPRI physical interface such that the bandwidth of the timeslot of the CPRI physical interface is greater than 491.52 Mbps. For example, an overhead bearing area of one byte is newly added to every 32 bytes, or an overhead bearing area of one word is newly added to every 32 words, or an overhead bearing area of one basic frame is newly added to every 32 basic frames. As shown in FIG. 11A, FIG. 11B, and FIG. 11C, the overhead bearing area of one basic frame is newly added to every 32 basic frames. In the newly-added eight basic frames, control words of the first four basic frames are used to carry a newly-added overhead such as GID, Next Port ID (NPID), This Port ID (TPID), Virtual CPRI Identification (VID), or a synchronization byte, all the last 15 words are reserved for another purpose, and another word except the control word in the last four basic frames may be used as the protocol channel for negotiating the mapping relationship with the receive end.

In this embodiment of the present disclosure, first, a super frame of a virtual elastic CPRI is constructed, where the super frame of the virtual elastic CPRI is a data frame of a CPRI physical interface that is equivalent to N times of a reference rate. Then a frame structure of a physical interface is divided into multiple timeslots, where bandwidth of the timeslots is not less than the reference rate. Then the super frame of the virtual elastic CPRI is placed into at least one timeslot of the multiple timeslots in the frame structure of the physical interface to obtain a new data frame, and finally, the new data frame is sent to a receive end using the physical interface. Therefore, network bandwidth utilization is improved.

Figure 6:
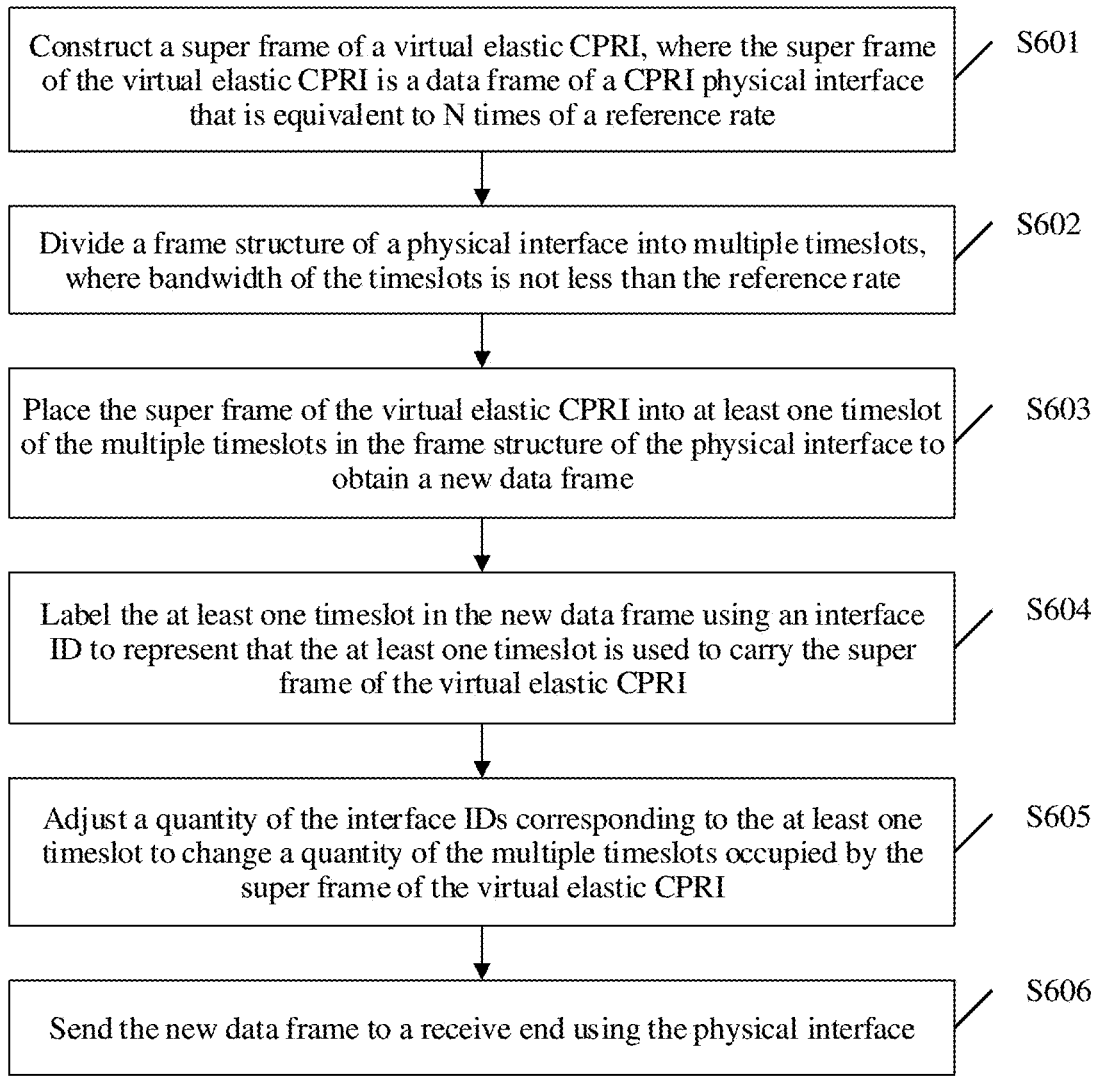
FIG. 6 is a flowchart of a second embodiment of a data frame transmission method for a virtual elastic CPRI according to the present disclosure.

Referring to FIG. 6, FIG. 6 is a flowchart of a second embodiment of a data frame transmission method for a virtual elastic CPRI according to the present disclosure. As shown in FIG. 6, the method in this embodiment of the present disclosure includes the following steps.

Step S601: Construct a super frame of a virtual elastic CPRI, where the super frame of the virtual elastic CPRI is a data frame of a CPRI physical interface that is equivalent to N times of a reference rate, and N is a positive integer.

In specific implementation, a data frame in a 10 ms frame period of the CPRI physical interface includes 150 super frames, each super frame includes 256 basic frames, and a rate of the basic frame is 3840000 fps (150×256/10 ms=3.84 Mfps). Each basic frame includes 16 words, each word includes N bytes, and a quantity N of bytes of each word is related to a rate option of the CPRI physical interface. As shown in FIG. 2A and FIG. 2B, one time of the reference rate is 491.52 Mbps×1, and one word includes one byte, two times of the reference rate is 491.52 Mbps×2, and one word includes two bytes, four times of the reference rate is 491.52 Mbps×4, and one word includes four bytes, and so on. Each basic frame includes one control word and 15 data words. The first word of the basic frame is the control word, the control word is used for interface control and an overhead, other words in the basic frame are the data words, and the data words are used to divide multiple single-carrier single-antenna IQ data areas to carry IQ data. A control word of the first basic frame in the super frame is a synchronization byte of the super frame, and for different rate options, composition of the synchronization byte is different. For example, an ×1 rate option uses 8B/10B encoding and uses a character 0×BC as a synchronization byte [#Z.0.0], an ×20 rate option uses 64B/66B encoding, synchronization bytes [#Z.0.0-#Z.0.19] have 20 bytes, and except that [#Z.0.7] is 0×FD, an end character in the 64B/66B encoding is defined as/T/, [#Z.0.8]=0×FD, and a start character in the 64B/66B encoding is defined as/S/, all other characters are padding characters 0×50.

Based on a frame structure of the foregoing super frame, the data frame of the CPRI physical interface that is equivalent to N times of the reference rate may be constructed. A data frame shown in FIG. 3C is a constructed super frame of a virtual elastic CPRI that is two times of the reference rate. The super frame includes 256 basic frames, each basic frame includes 16 words, each word includes two bytes, the first byte of the basic frame is a control word, the first word of the first basic frame in the super frame is a synchronization byte, and the super frame has two times of the reference rate.

Optionally, super frames of multiple CPRI physical interfaces that are equivalent to N times of the reference rate may be sequentially arranged in a word extension sequence to construct a data frame of the virtual elastic CPRI. A data frame shown in FIG. 4A is a super frame that is of a virtual elastic CPRI and that is obtained by arranging, in a byte sequence, super frames of two CPRI physical interfaces that are equivalent to one time of the reference rate, and a data frame in FIG. 4B is a super frame that is of a virtual elastic CPRI and that is obtained by arranging, in a byte sequence, super frames of two CPRI physical interfaces that are equivalent to two times of the reference rate.

Step S602: Divide a frame structure of a physical interface into multiple timeslots, where bandwidth of the timeslots is not less than the reference rate.

In specific implementation, the physical interface includes the CPRI physical interface, and bandwidth of a timeslot of the CPRI physical interface may be 491.52 Mbps. A frame structure except a first synchronization byte of the super frame of the CPRI physical interface may be divided into multiple timeslots according to a quantity of bytes of each word in the super frame, where the first synchronization byte is the first word of the first basic frame of multiple basic frames in the super frame of the CPRI physical interface. Because a synchronization byte of the super frame of the virtual elastic CPRI is a fixed pattern and may be restored at a receive end according to an inherent pattern, the first synchronization byte of the frame structure of the CPRI physical interface may be reserved. A frame structure shown in FIG. 3B is a super frame of a physical interface that is 16 times of the reference rate, and the frame structure except the first word of the first basic frame in the super frame is divided into 16 timeslots according to a quantity 16 of bytes of each word in the super frame.

Optionally, the physical interface includes an Ethernet physical interface, and bandwidth of a timeslot of the Ethernet physical interface may be 500 Mbps. A frame structure except a frame overhead and a synchronization header in one frame period of the Ethernet physical interface may be divided, per byte, into multiple timeslots that alternate at intervals. As shown in FIG. 5, the frame structure in one frame period includes 3125 bytes, the first five bytes are the frame overhead and the synchronization header, the remaining 3120 bytes are divided, per byte, into a timeslot 1 and a timeslot 2 that alternate at intervals, and each timeslot is 3120/2=1560 bytes.

Step S603: Place the super frame of the virtual elastic CPRI into at least one timeslot of the multiple timeslots in the frame structure of the physical interface to obtain a new data frame.

In specific implementation, the super frame of the virtual elastic CPRI may be placed into the at least one timeslot of the multiple timeslots in the frame structure of the physical interface according to a byte arrangement sequence in the super frame of the virtual elastic CPRI to obtain the new data frame. Another unused timeslot may be selectively filled with a byte of no information meaning, such as 0×00, 0×55, or another byte.

Optionally, the physical interface includes the CPRI physical interface, and another byte other than a second synchronization byte in the super frame of the virtual elastic CPRI may be placed into at least one timeslot of the multiple timeslots in the frame structure of the super frame of the CPRI physical interface to obtain a new data frame. The second synchronization byte is the first word of the first basic frame of multiple basic frames in the super frame of the virtual elastic CPRI. A frame structure shown in FIG. 3A is a new data frame obtained by placing another byte other than the second synchronization byte in the super frame of the virtual elastic CPRI into the second timeslot and the fourth timeslot in the frame structure of the super frame of the CPRI physical interface.

Optionally, the physical interface includes the Ethernet physical interface, and the super frame of the virtual elastic CPRI may be placed into at least one timeslot of the multiple timeslots that alternate at intervals in the frame structure in one frame period of the Ethernet physical interface. As shown in FIG. 5, super frames (256×16×3=4096×3 bytes) of three virtual elastic CPRIs may be placed into locations of 1560×8 bytes of the timeslot of the Ethernet physical interface.

It should be noted that super frames of multiple virtual elastic CPRIs may be placed into multiple timeslots of a frame structure of one physical interface, a super frame of one virtual elastic CPRI may be simultaneously placed into multiple timeslots of frame structures of multiple physical interfaces, a super frame of one virtual elastic CPRI may be simultaneously placed into a timeslot of a frame structure of one physical interface, or super frames of multiple virtual elastic CPRIs are placed into multiple timeslots of frame structures of multiple physical interfaces in order to properly allocate a timeslot of a frame structure of a physical interface and improve network bandwidth utilization.

Step S604: Label the at least one timeslot in the new data frame using an interface ID to represent that the at least one timeslot is used to carry the super frame of the virtual elastic CPRI.

Figure 7B:
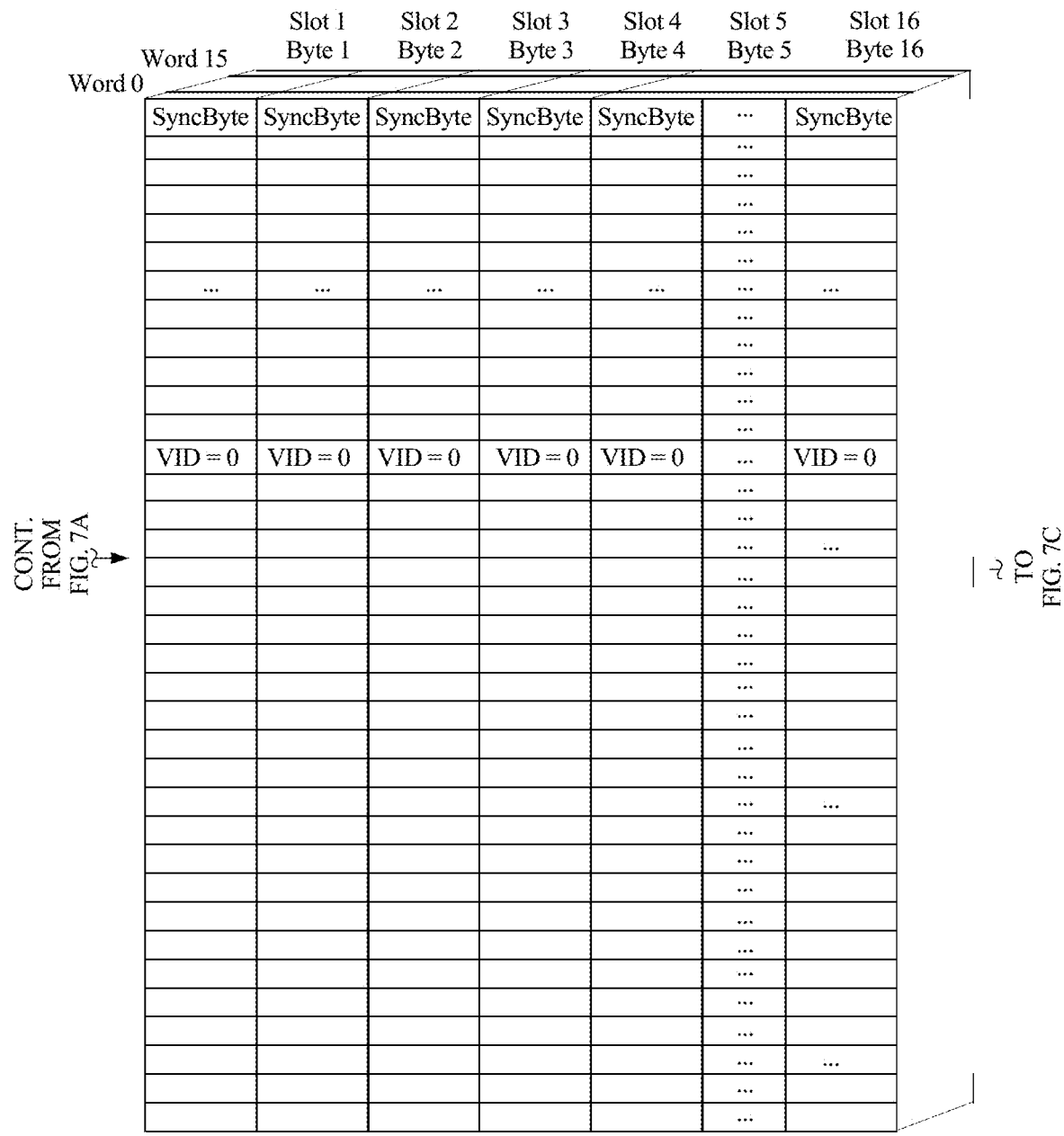

In specific implementation, the at least one timeslot may be labeled in a control word of a basic frame of the new data frame using the interface ID. As shown in FIG. 7A, FIG. 7B, and FIG. 7C, the other byte other than the second synchronization byte in the super frame of the virtual elastic CPRI is placed into the second timeslot and the fourth timeslot in the frame structure of the super frame of the CPRI physical interface. To represent that the second timeslot and the fourth timeslot are used to carry the super frame of the virtual elastic CPRI, labeling may be performed using VID=a in an overhead byte reserved in a control word of the 67th basic frame of the new data frame, and another unused timeslot is labeled using VID=0.

Step S605: Adjust a quantity of the interface IDs corresponding to the at least one timeslot to change a quantity of the multiple timeslots occupied by the super frame of the virtual elastic CPRI.

In specific implementation, a target timeslot except the at least one timeslot of multiple timeslots in the new data frame may be labeled using the interface ID, and the target timeslot is added to a next data frame of the new data frame so as to carry the super frame of the virtual elastic CPRI. As shown in FIG. 7A, FIG. 7B, and FIG. 7C, labeling may be performed using VID=a in another byte selected from the control word of the 67th basic frame of the new data frame, and an added timeslot in the new data frame does not carry the super frame of the virtual elastic CPRI in order to instruct the receive end to carry, by simultaneously using three timeslots, the super frame of the virtual elastic CPRI from the next data frame of the new data frame.

Optionally, the interface ID includes a first ID of a first virtual elastic CPRI and a second ID of a second virtual elastic CPRI, and a quantity of timeslots in a new data frame corresponding to the first ID and the second ID may be adjusted. When bandwidth of a timeslot corresponding to a super frame of the first virtual elastic CPRI needs to be decreased and bandwidth of a timeslot corresponding to a super frame of the second virtual elastic CPRI needs to be increased, a quantity of the first IDs and the second IDs in the control word of the basic frame may be adjusted in order to change a quantity of timeslots occupied by the super frame of the first virtual elastic CPRI and the super frame of the second virtual elastic CPRI and to carry the super frame of the virtual elastic CPRI using an adjusted timeslot from the next data frame of the new data frame, thereby properly using the timeslot of the physical interface. As shown in FIG. 8A and FIG. 8B, in the 67th basic frame of the new data frame, a super frame of a virtual elastic CPRI corresponding to VID=5 occupies the second timeslot and the fourth timeslot of the CPRI physical interface, a super frame of a virtual elastic CPRI corresponding to VID=3 occupies the third timeslot of the CPRI physical interface, and VID=5 of the fourth timeslot of the CPRI physical interface may be changed to VID=3.

Step S606: Send the new data frame to a receive end using the physical interface.

In specific implementation, the new data frame may be sent to the receive end using the Ethernet physical interface or the CPRI physical interface. In addition, a control word of a second basic frame of the new data frame may be used as a protocol channel for negotiating a mapping relationship with the receive end, or a third basic frame is added to the new data frame and another word in the third basic frame except the control word is used as a protocol channel for negotiating a mapping relationship with the receive end. The mapping relationship is an arrangement relationship of placing the super frame of the virtual elastic CPRI into the at least one timeslot of the multiple timeslots in the frame structure of the physical interface. After receiving the new data frame, the receive end may transform the new data frame according to the agreed mapping relationship so as to obtain the super frame of the virtual elastic CPRI. It should be noted that the mapping relationship may also be negotiated by means of manual configuration or using a third party channel.

It should be noted that the bandwidth may be increased in a manner of increasing an overhead bearing area of the frame structure of the CPRI physical interface such that the bandwidth of the timeslot of the CPRI physical interface is greater than 491.52 Mbps. For example, an overhead bearing area of one byte is newly added to every 32 bytes, or an overhead bearing area of one word is newly added to every 32 words, or an overhead bearing area of one basic frame is newly added to every 32 basic frames. As shown in FIG. 11A, FIG. 11B, and FIG. 11C, the overhead bearing area of one basic frame is newly added to every 32 basic frames. In the newly-added eight basic frames, control words of the first four basic frames are used to carry a newly-added overhead such as GID, NPID, TPID, VID, or a synchronization byte, all the last 15 words are reserved for another purpose, and another word except the control word in the last four basic frames is used as the protocol channel for negotiating the mapping relationship with the receive end.

In this embodiment of the present disclosure, first, a super frame of a virtual elastic CPRI is constructed, where the super frame of the virtual elastic CPRI is a data frame of a CPRI physical interface that is equivalent to N times of a reference rate. Then a frame structure of a physical interface is divided into multiple timeslots, where bandwidth of the timeslots is not less than the reference rate. Then the super frame of the virtual elastic CPRI is placed into at least one timeslot of the multiple timeslots in the frame structure of the physical interface to obtain a new data frame, and finally, the new data frame is sent to a receive end using the physical interface. Therefore, network bandwidth utilization is improved.

Figure 9:
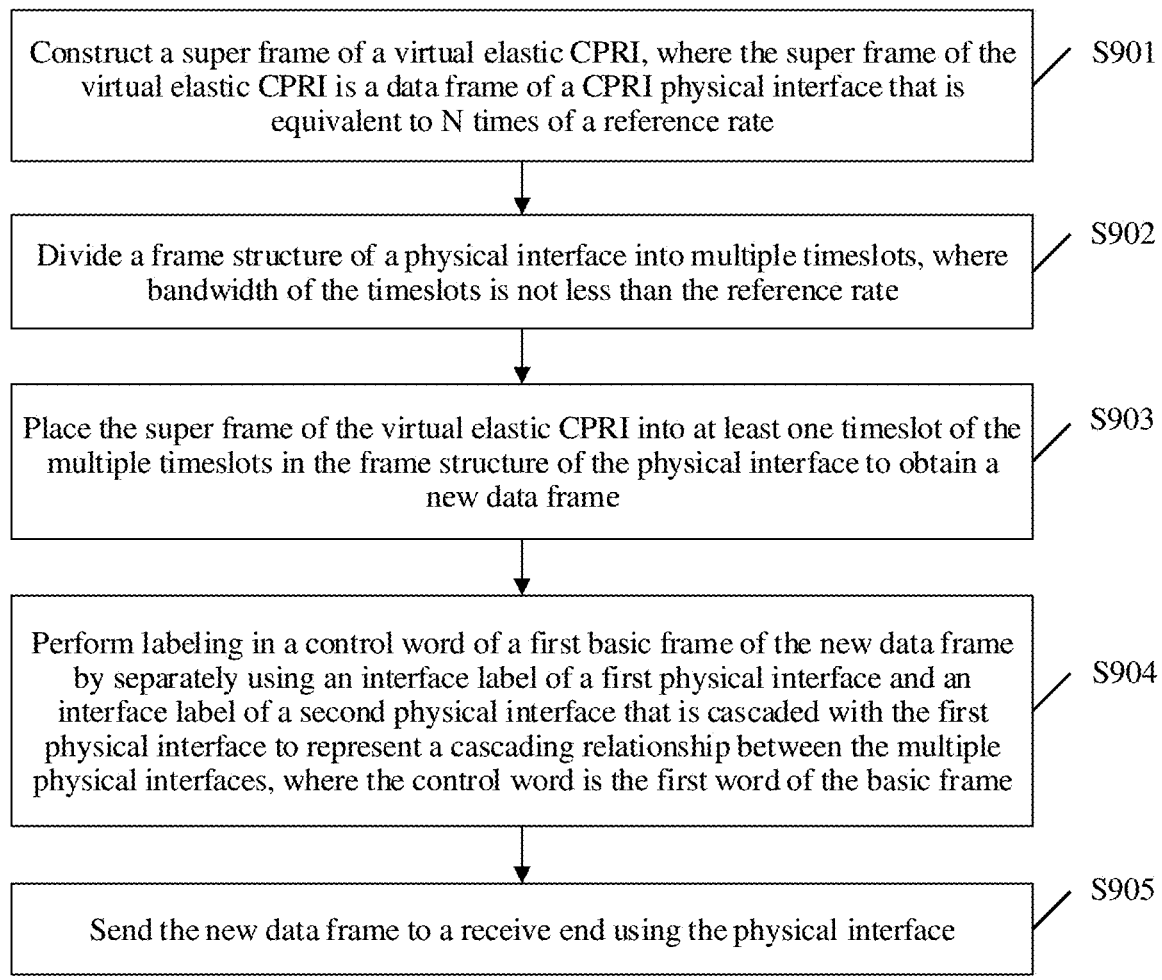
FIG. 9 is a flowchart of a third embodiment of a data frame transmission method for a virtual elastic CPRI according to the present disclosure.

Referring to FIG. 9, FIG. 9 is a flowchart of a third embodiment of a data frame transmission method for a virtual elastic CPRI according to the present disclosure. As shown in FIG. 9, the method in this embodiment of the present disclosure includes the following steps.

Step S901: Construct a super frame of a virtual elastic CPRI, where the super frame of the virtual elastic CPRI is a data frame of a CPRI physical interface that is equivalent to N times of a reference rate, and N is a positive integer.

In specific implementation, a data frame in a 10 ms frame period of the CPRI physical interface includes 150 super frames, each super frame includes 256 basic frames, and a rate of the basic frame is 3840000 fps (150×256/10 ms=3.84 Mfps). Each basic frame includes 16 words, each word includes N bytes, and a quantity N of bytes of each word is related to a rate option of the CPRI physical interface. As shown in FIG. 2A and FIG. 2B, one time of the reference rate is 491.52 Mbps×1, and one word includes one byte, two times of the reference rate is 491.52 Mbps×2, and one word includes two bytes, four times of the reference rate is 491.52 Mbps×4, and one word includes four bytes, and so on. Each basic frame includes one control word and 15 data words. The first word of the basic frame is the control word, the control word is used for interface control and an overhead, other words in the basic frame are the data words, and the data words are used to divide multiple single-carrier single-antenna IQ data areas to carry IQ data. A control word of the first basic frame in the super frame is a synchronization byte of the super frame, and for different rate options, composition of the synchronization byte is different. For example, an ×1 rate option uses 8B/10B encoding and uses a character 0×BC as a synchronization byte [#Z.0.0], an ×20 rate option uses 64B/66B encoding, synchronization bytes [#Z.0.0-#Z.0.19] have 20 bytes, and except that [#Z.0.7] is 0×FD, an end character in the 64B/66B encoding is defined as /T/, [#Z.0.8]=0×FD, and a start character in the 64B/66B encoding is defined as /S/, all other characters are padding characters 0×50.

Based on a frame structure of the foregoing super frame, the data frame of the CPRI physical interface that is equivalent to N times of the reference rate may be constructed. A data frame shown in FIG. 3C is a constructed super frame of a virtual elastic CPRI that is two times of the reference rate. The super frame includes 256 basic frames, each basic frame includes 16 words, each word includes two bytes, the first byte of the basic frame is a control word, the first word of the first basic frame in the super frame is a synchronization byte, and the super frame has two times of the reference rate.

Optionally, super frames of multiple CPRI physical interfaces that are equivalent to N times of the reference rate may be sequentially arranged in a word extension sequence to construct a data frame of the virtual elastic CPRI. A data frame shown in FIG. 4A is a super frame that is of a virtual elastic CPRI and that is obtained by arranging, in a byte sequence, super frames of two CPRI physical interfaces that are equivalent to one time of the reference rate, and a data frame in FIG. 4B is a super frame that is of a virtual elastic CPRI and that is obtained by arranging, in a byte sequence, super frames of two CPRI physical interfaces that are equivalent to two times of the reference rate.

Step S902: Divide a frame structure of a physical interface into multiple timeslots, where bandwidth of the timeslots is not less than the reference rate.

In specific implementation, the physical interface includes the CPRI physical interface, and bandwidth of a timeslot of the CPRI physical interface may be 491.52 Mbps. A frame structure except a first synchronization byte of the super frame of the CPRI physical interface may be divided into multiple timeslots according to a quantity of bytes of each word in the super frame, where the first synchronization byte is the first word of the first basic frame of multiple basic frames in the super frame of the CPRI physical interface. Because a synchronization byte of the super frame of the virtual elastic CPRI is a fixed pattern and may be restored at a receive end according to an inherent pattern, the first synchronization byte of the frame structure of the CPRI physical interface may be reserved. A frame structure shown in FIG. 3B is a super frame of a physical interface that is 16 times of the reference rate, and the frame structure except the first word of the first basic frame in the super frame is divided into 16 timeslots according to a quantity 16 of bytes of each word in the super frame.

Optionally, the physical interface includes an Ethernet physical interface, and bandwidth of a timeslot of the Ethernet physical interface may be 500 Mbps. A frame structure except a frame overhead and a synchronization header in one frame period of the Ethernet physical interface may be divided, per byte, into multiple timeslots that alternate at intervals. As shown in FIG. 5, the frame structure in one frame period includes 3125 bytes, the first five bytes are the frame overhead and the synchronization header, the remaining 3120 bytes are divided, per byte, into a timeslot 1 and a timeslot 2 that alternate at intervals, and each timeslot is 3120/2=1560 bytes.

Step S903: Place the super frame of the virtual elastic CPRI into at least one timeslot of the multiple timeslots in the frame structure of the physical interface to obtain a new data frame.

In specific implementation, the super frame of the virtual elastic CPRI may be placed into the at least one timeslot of the multiple timeslots in the frame structure of the physical interface according to a byte arrangement sequence in the super frame of the virtual elastic CPRI to obtain the new data frame. Another unused timeslot may be selectively filled with a byte of no information meaning, such as 0×00, 0×55, or another byte.

Optionally, the physical interface includes the CPRI physical interface, and another byte other than a second synchronization byte in the super frame of the virtual elastic CPRI may be placed into at least one timeslot of the multiple timeslots in the frame structure of the super frame of the CPRI physical interface to obtain a new data frame. The second synchronization byte is the first word of the first basic frame of multiple basic frames in the super frame of the virtual elastic CPRI. A frame structure shown in FIG. 3A is a new data frame obtained by placing another byte other than the second synchronization byte in the super frame of the virtual elastic CPRI into the second timeslot and the fourth timeslot in the frame structure of the super frame of the CPRI physical interface.

Optionally, the physical interface includes the Ethernet physical interface, and the super frame of the virtual elastic CPRI may be placed into at least one timeslot of the multiple timeslots that alternate at intervals in the frame structure in one frame period of the Ethernet physical interface. As shown in FIG. 5, super frames (256×16×3=4096×3 bytes) of three virtual elastic CPRIs may be placed into locations of 1560×8 bytes of the timeslot of the Ethernet physical interface.

It should be noted that super frames of multiple virtual elastic CPRIs may be placed into multiple timeslots of a frame structure of one physical interface, a super frame of one virtual elastic CPRI may be simultaneously placed into multiple timeslots of frame structures of multiple physical interfaces, a super frame of one virtual elastic CPRI may be simultaneously placed into a timeslot of a frame structure of one physical interface, or super frames of multiple virtual elastic CPRIs are placed into multiple timeslots of frame structures of multiple physical interfaces in order to properly allocate a timeslot of a frame structure of a physical interface and improve network bandwidth utilization.

Step S904: Perform labeling in a control word of a first basic frame of the new data frame by separately using an interface label of a first physical interface and an interface label of a second physical interface that is cascaded with the first physical interface to represent a cascading relationship between the multiple physical interfaces, where the control word is the first word of the basic frame.

Figure 10C:
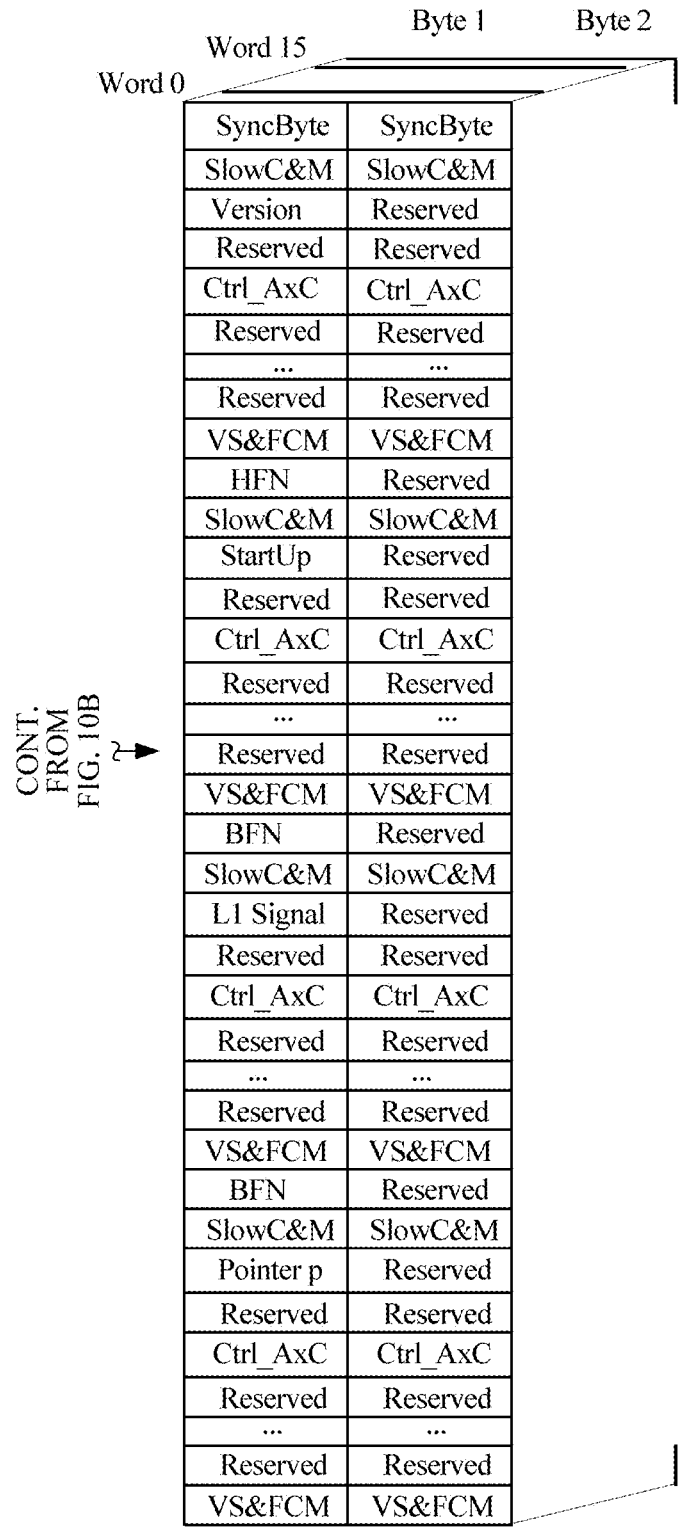

As shown in FIG. 10A, FIG. 10B, and FIG. 10C, a super frame of a virtual elastic CPRI that is equivalent to two times of the reference rate is placed into frame structures of two CPRI physical interfaces that are 16 times of the reference rate. An interface label of the first physical interface is 5, and an interface label of the second physical interface is 3. In the third basic frame of a new data frame corresponding to the first physical interface, TPID=5, and NPID=3, representing that the first physical interface is cascaded with the second physical interface whose interface label is 3, and in the third basic frame of a new data frame corresponding to the second physical interface, TPID=3, and NPID is null, representing that no other physical interface is cascaded after the second physical interface.

Optionally, labeling may be performed in the control word of the first basic frame using a GID to represent that all the multiple cascaded physical interfaces are configured to carry the super frame of the virtual elastic CPRI. As shown in FIG. 10A, FIG. 10B, and FIG. 10C, labeling is performed using GID=A in a control word of the third basic frame of the new data frame, representing that the first physical interface and the second physical interface belong to one cascading group, and the cascading group is used to carry super frames of a same virtual elastic CPRI.

Optionally, if one physical interface is increased or decreased to carry the super frame of the virtual elastic CPRI, a cascading relationship of a next data frame may be indicated to the receive end one data frame period in advance, and then the super frame of the virtual elastic CPRI is carried in the next data frame according to a new cascading relationship.

Step S905: Send the new data frame to a receive end using the physical interface.

In specific implementation, the new data frame may be sent to the receive end using the Ethernet physical interface or the CPRI physical interface. In addition, a third basic frame of the new data frame may be used as a protocol channel for negotiating a mapping relationship with the receive end, or a basic frame is added to the new data frame to be used as a protocol channel for negotiating a mapping relationship with the receive end. The mapping relationship is an arrangement relationship of placing the super frame of the virtual elastic CPRI into the at least one timeslot of the multiple timeslots in the frame structure of the physical interface. After receiving the new data frame, the receive end may transform the new data frame according to the agreed mapping relationship so as to obtain the super frame of the virtual elastic CPRI. It should be noted that the mapping relationship may also be negotiated by means of manual configuration or using a third party channel.

It should be noted that the bandwidth may be increased in a manner of increasing an overhead bearing area of the frame structure of the CPRI physical interface such that the bandwidth of the timeslot of the CPRI physical interface is greater than 491.52 Mbps. For example, an overhead bearing area of one byte is newly added to every 32 bytes, or an overhead bearing area of one word is newly added to every 32 words, or an overhead bearing area of one basic frame is newly added to every 32 basic frames. As shown in FIG. 11A, FIG. 11B, and FIG. 11C, the overhead bearing area of one basic frame is newly added to every 32 basic frames. In the newly-added eight basic frames, control words of the first four basic frames are used to carry a newly-added overhead such as GID, NPID, TPID, VID, or a synchronization byte, all the last 15 words are reserved for another purpose, and another word except the control word in the last four basic frames may be used as the protocol channel for negotiating the mapping relationship with the receive end.

In this embodiment of the present disclosure, first, a super frame of a virtual elastic CPRI is constructed, where the super frame of the virtual elastic CPRI is a data frame of a CPRI physical interface that is equivalent to N times of a reference rate. Then a frame structure of a physical interface is divided into multiple timeslots, where bandwidth of the timeslots is not less than the reference rate. Then the super frame of the virtual elastic CPRI is placed into at least one timeslot of the multiple timeslots in the frame structure of the physical interface to obtain a new data frame, and finally, the new data frame is sent to a receive end using the physical interface. Therefore, network bandwidth utilization is improved.

Figure 12:
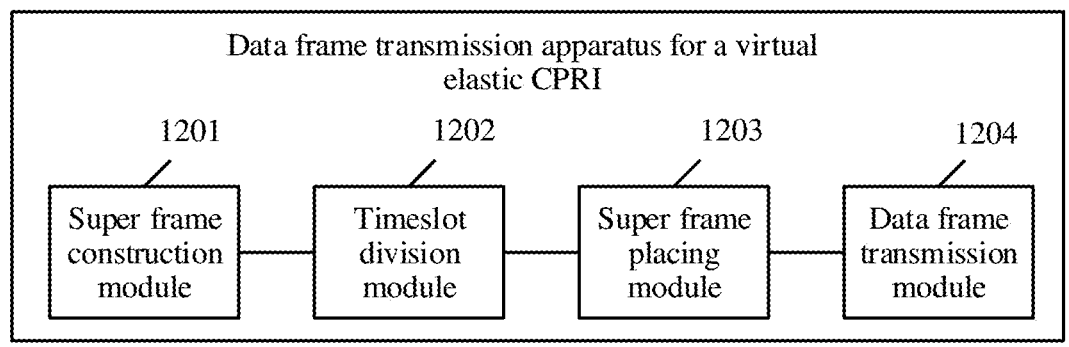
FIG. 12 is a schematic structural diagram of a data frame transmission apparatus for a virtual elastic CPRI according to an embodiment of the present disclosure.

Referring to FIG. 12, FIG. 12 is a schematic structural diagram of a data frame transmission apparatus for a virtual elastic CPRI according to an embodiment of the present disclosure. As shown in FIG. 12, the apparatus in this embodiment of the present disclosure includes a super frame construction module 1201, a timeslot division module 1202, a super frame placing module 1203, and a data frame transmission module 1204.

The super frame construction module 1201 is configured to construct a super frame of a virtual elastic CPRI, where the super frame of the virtual elastic CPRI is a data frame of a CPRI physical interface that is equivalent to N times of a reference rate, and N is a positive integer.

In specific implementation, a data frame in a 10 ms frame period of the CPRI physical interface includes 150 super frames, each super frame includes 256 basic frames, and a rate of the basic frame is 3840000 fps (150×256/10 ms=3.84 Mfps). Each basic frame includes 16 words, each word includes N bytes, and a quantity N of bytes of each word is related to a rate option of the CPRI physical interface. As shown in FIG. 2A and FIG. 2B, one time of the reference rate is 491.52 Mbps×1, and one word includes one byte, two times of the reference rate is 491.52 Mbps×2, and one word includes two bytes, four times of the reference rate is 491.52 Mbps×4, and one word includes four bytes, and so on. Each basic frame includes one control word and 15 data words. The first word of the basic frame is the control word, the control word is used for interface control and an overhead, other words in the basic frame are the data words, and the data words are used to divide multiple single-carrier single-antenna IQ data areas to carry IQ data. A control word of the first basic frame in the super frame is a synchronization byte of the super frame, and for different rate options, composition of the synchronization byte is different. For example, an ×1 rate option uses 8B/10B encoding and uses a character 0×BC as a synchronization byte [#Z.0.0], an ×20 rate option uses 64B/66B encoding, synchronization bytes [#Z.0.0-#Z.0.19] have 20 bytes, and except that [#Z.0.7] is 0×FD, an end character in the 64B/66B encoding is defined as/T/, [#Z.0.8]=0×FD, and a start character in the 64/66b encoding is defined as/S/, all other characters are padding characters 0×50.

Based on a frame structure of the foregoing super frame, the data frame of the CPRI physical interface that is equivalent to N times of the reference rate may be constructed. A data frame on shown in FIG. 3C is a constructed super frame of a virtual elastic CPRI that is two times of the reference rate. The super frame includes 256 basic frames, each basic frame includes 16 words, each word includes two bytes, the first byte of the basic frame is a control word, the first word of the first basic frame in the super frame is a synchronization byte, and the super frame has two times of the reference rate.

Optionally, super frames of multiple CPRI physical interfaces that are equivalent to N times of the reference rate may be sequentially arranged in a word extension sequence to construct a data frame of the virtual elastic CPRI. A data frame shown in FIG. 4A is a super frame that is of a virtual elastic CPRI and that is obtained by arranging, in a byte sequence, super frames of two CPRI physical interfaces that are equivalent to one time of the reference rate, and a data frame shown in FIG. 4B is a super frame that is of a virtual elastic CPRI and that is obtained by arranging, in a byte sequence, super frames of two CPRI physical interfaces that are equivalent to two times of the reference rate.

The timeslot division module 1202 is configured to divide a frame structure of a physical interface into multiple timeslots, where bandwidth of the timeslots is not less than the reference rate.

In specific implementation, the physical interface includes the CPRI physical interface, and bandwidth of a timeslot of the CPRI physical interface may be 491.52 Mbps. A frame structure except a first synchronization byte of the super frame of the CPRI physical interface may be divided into multiple timeslots according to a quantity of bytes of each word in the super frame, where the first synchronization byte is the first word of the first basic frame of multiple basic frames in the super frame of the CPRI physical interface. Because a synchronization byte of the super frame of the virtual elastic CPRI is a fixed pattern and may be restored at a receive end according to an inherent pattern, the first synchronization byte of the frame structure of the CPRI physical interface may be reserved. A frame structure shown in FIG. 3B is a super frame of a physical interface that is 16 times of the reference rate, and the frame structure except the first word of the first basic frame in the super frame is divided into 16 timeslots according to a quantity 16 of bytes of each word in the super frame.

Optionally, the physical interface includes an Ethernet physical interface, and bandwidth of a timeslot of the Ethernet physical interface may be 500 Mbps. A frame structure except a frame overhead and a synchronization header in one frame period of the Ethernet physical interface may be divided, per byte, into multiple timeslots that alternate at intervals. As shown in FIG. 5, the frame structure in one frame period includes 3125 bytes, the first five bytes are the frame overhead and the synchronization header, the remaining 3120 bytes are divided, per byte, into a timeslot 1 and a timeslot 2 that alternate at intervals, and each timeslot is 3120/2=1560 bytes.

The super frame placing module 1203 is configured to place the super frame of the virtual elastic CPRI into at least one timeslot of the multiple timeslots in the frame structure of the physical interface to obtain a new data frame.

In specific implementation, the super frame of the virtual elastic CPRI may be placed into the at least one timeslot of the multiple timeslots in the frame structure of the physical interface according to a byte arrangement sequence in the super frame of the virtual elastic CPRI to obtain the new data frame. Another unused timeslot may be selectively filled with a byte of no information meaning, such as 0×00, 0×55, or another byte.

Optionally, the physical interface includes the CPRI physical interface, and another byte other than a second synchronization byte in the super frame of the virtual elastic CPRI may be placed into at least one timeslot of the multiple timeslots in the frame structure of the super frame of the CPRI physical interface to obtain a new data frame. The second synchronization byte is the first word of the first basic frame of multiple basic frames in the super frame of the virtual elastic CPRI. A frame structure shown in FIG. 3A is a new data frame obtained by placing another byte other than the second synchronization byte in the super frame of the virtual elastic CPRI into the second timeslot and the fourth timeslot in the frame structure of the super frame of the CPRI physical interface.

Optionally, the physical interface includes the Ethernet physical interface, and the super frame of the virtual elastic CPRI may be placed into at least one timeslot of the multiple timeslots that alternate at intervals in the frame structure in one frame period of the Ethernet physical interface. As shown in FIG. 5, super frames (256×16×3=4096×3 bytes) of three virtual elastic CPRIs may be placed into locations of 1560×8 bytes of the timeslot of the Ethernet physical interface.

It should be noted that super frames of multiple virtual elastic CPRIs may be placed into multiple timeslots of a frame structure of one physical interface, a super frame of one virtual elastic CPRI may be simultaneously placed into multiple timeslots of frame structures of multiple physical interfaces, a super frame of one virtual elastic CPRI may be simultaneously placed into a timeslot of a frame structure of one physical interface, or super frames of multiple virtual elastic CPRIs are placed into multiple timeslots of frame structures of multiple physical interfaces in order to properly allocate a timeslot of a frame structure of a physical interface and improve network bandwidth utilization.

Optionally, the super frame placing module 1203 may be further configured to label the at least one timeslot in the new data frame using an interface ID to represent that the at least one timeslot is used to carry the super frame of the virtual elastic CPRI. In specific implementation, the at least one timeslot may be labeled in a control word of a basic frame of the new data frame using the interface ID. As shown in FIG. 7A, FIG. 7B, and FIG. 7C, the other byte other than the second synchronization byte in the super frame of the virtual elastic CPRI is placed into the second timeslot and the fourth timeslot in the frame structure of the super frame of the CPRI physical interface. To represent that the second timeslot and the fourth timeslot are used to carry the super frame of the virtual elastic CPRI, labeling may be performed using VID=a in an overhead byte reserved in a control word of the 67th basic frame of the new data frame, and another unused timeslot is labeled using VID=0.

Optionally, the super frame placing module 1203 may be further configured to adjust a quantity of the interface IDs corresponding to the at least one timeslot to change a quantity of the multiple timeslots occupied by the super frame of the virtual elastic CPRI. In specific implementation, a target timeslot except the at least one timeslot of multiple timeslots in the new data frame may be labeled using the interface ID, and the target timeslot is added to a next data frame of the new data frame so as to carry the super frame of the virtual elastic CPRI. As shown in FIG. 7A, FIG. 7B, and FIG. 7C, labeling may be performed using VID=a in the control word of the 67th basic frame of the new data frame, and an added timeslot in the new data frame does not carry the super frame of the virtual elastic CPRI in order to instruct the receive end to carry, by simultaneously using three timeslots, the super frame of the virtual elastic CPRI from the next data frame of the new data frame.

In addition, the interface ID includes a first ID of a first virtual elastic CPRI and a second ID of a second virtual elastic CPRI, and a quantity of timeslots in a new data frame corresponding to the first ID and the second ID may be adjusted. When bandwidth of a timeslot corresponding to a super frame of the first virtual elastic CPRI needs to be decreased and bandwidth of a timeslot corresponding to a super frame of the second virtual elastic CPRI needs to be increased, a quantity of the first IDs and the second IDs in the control word of the basic frame may be adjusted in order to change a quantity of timeslots occupied by the super frame of the first virtual elastic CPRI and the super frame of the second virtual elastic CPRI and to carry the super frame of the virtual elastic CPRI using an adjusted timeslot from the next data frame of the new data frame, thereby properly using the timeslot of the physical interface. As shown in FIG. 8A and FIG. 8B, in the 67th basic frame of the new data frame, a super frame of a virtual elastic CPRI corresponding to VID=5 occupies the second timeslot and the fourth timeslot of the CPRI physical interface, a super frame of a virtual elastic CPRI corresponding to VID=3 occupies the third timeslot of the CPRI physical interface, and VID=5 of the fourth timeslot of the CPRI physical interface may be changed to VID=3.

The super frame placing module 1203 may be further configured to perform labeling in a control word of a first basic frame of the new data frame by separately using an interface label of a first physical interface and an interface label of a second physical interface that is cascaded with the first physical interface, to represent a cascading relationship between the multiple physical interfaces, where the control word is the first word of the basic frame. As shown in FIG. 10A, FIG. 10B, and FIG. 10C, a super frame of a virtual elastic CPRI that is equivalent to two times of the reference rate is placed into frame structures of two CPRI physical interfaces that are 16 times of the reference rate. An interface label of the first physical interface is 5, and an interface label of the second physical interface is 3. In the third basic frame of a new data frame corresponding to the first physical interface, TPID=5, and NPID=3, representing that the first physical interface is cascaded with the second physical interface whose interface label is 3, and in the third basic frame of a new data frame corresponding to the second physical interface, TPID=3, and NPID is null, representing that no other physical interface is cascaded after the second physical interface.

Optionally, the super frame placing module 1203 may be further configured to perform labeling in the control word of the first basic frame using a GID to represent that all the multiple cascaded physical interfaces are configured to carry the super frame of the virtual elastic CPRI. As shown in FIG. 10A, FIG. 10B, and FIG. 10C, labeling is performed using GID=A in a control word of the third basic frame of the new data frame, representing that the first physical interface and the second physical interface belong to one cascading group, and the cascading group is used to carry super frames of a same virtual elastic CPRI.

Optionally, if one physical interface is increased or decreased to carry the super frame of the virtual elastic CPRI, the super frame placing module 1203 may be further configured to indicate a cascading relationship of a next data frame to the receive end one data frame period in advance, and carry the super frame of the virtual elastic CPRI in the next data frame according to a new cascading relationship.

The data frame transmission module 1204 is configured to send the new data frame to a receive end using the physical interface.

In specific implementation, the new data frame may be sent to the receive end using the Ethernet physical interface or the CPRI physical interface. In addition, a third basic frame of the new data frame may be used as a protocol channel for negotiating a mapping relationship with the receive end, or a basic frame is added to the new data frame to be used as a protocol channel for negotiating a mapping relationship with the receive end. The mapping relationship is an arrangement relationship of placing the super frame of the virtual elastic CPRI into the at least one timeslot of the multiple timeslots in the frame structure of the physical interface. After receiving the new data frame, the receive end may transform the new data frame according to the agreed mapping relationship so as to obtain the super frame of the virtual elastic CPRI. It should be noted that the mapping relationship may also be negotiated by means of manual configuration or using a third party channel.

It should be noted that the bandwidth may be increased in a manner of increasing an overhead bearing area of the frame structure of the CPRI physical interface such that the bandwidth of the timeslot of the CPRI physical interface is greater than 491.52 Mbps. For example, an overhead bearing area of one byte is newly added to every 32 bytes, or an overhead bearing area of one word is newly added to every 32 words, or an overhead bearing area of one basic frame is newly added to every 32 basic frames. As shown in FIG. 11A, FIG. 11B, and FIG. 11C, the overhead bearing area of one basic frame is newly added to every 32 basic frames. In the newly-added eight basic frames, control words of the first four basic frames are used to carry a newly-added overhead such as GID, NPID, TPID, VID, or a synchronization byte, all the last 15 words are reserved for another purpose, and another word except the control word in the last four basic frames may be used as the protocol channel for negotiating the mapping relationship with the receive end.

In this embodiment of the present disclosure, first, a super frame of a virtual elastic CPRI is constructed, where the super frame of the virtual elastic CPRI is a data frame of a CPRI physical interface that is equivalent to N times of a reference rate. Then a frame structure of a physical interface is divided into multiple timeslots, where bandwidth of the timeslots is not less than the reference rate. Then the super frame of the virtual elastic CPRI is placed into at least one timeslot of the multiple timeslots in the frame structure of the physical interface to obtain a new data frame, and finally, the new data frame is sent to a receive end using the physical interface. Therefore, network bandwidth utilization is improved.

Figure 13:
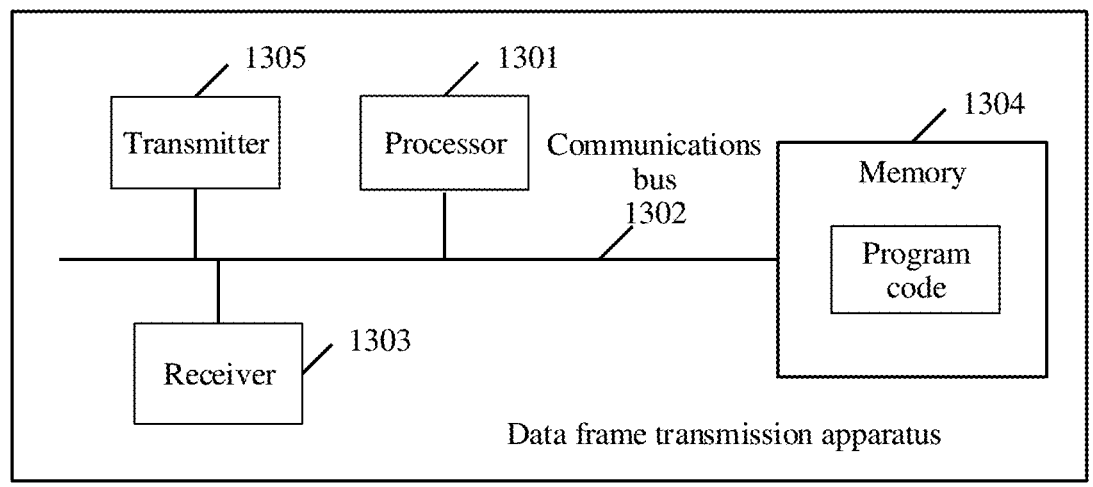
FIG. 13 is a schematic structural diagram of another data frame transmission apparatus for a virtual elastic CPRI according to an embodiment of the present disclosure.

FIG. 13 is a schematic structural diagram of a data frame transmission apparatus for a virtual elastic CPRI according to an embodiment of the present disclosure. As shown in FIG. 13, the apparatus may include a processor 1301, such as a central processing unit (CPU), a receiver 1303, a memory 1304, a transmitter 1305, and a communications bus 1302. The communications bus 1302 is configured to implement connection and communication between these components. The receiver 1303 and the transmitter 1305 of the apparatus in this embodiment of the present disclosure may be wired transmit ports, or may be wireless devices, for example, including antenna apparatuses, and are configured to perform signaling or data communication with another node device. The memory 1304 may be a high-speed random access memory (RAM), or may be a non-volatile memory, such as at least one disk memory. Optionally, the memory 1304 may be at least one storage apparatus located far away from the processor 1301. The memory 1304 stores a program code, and the processor 1301 is configured to invoke the program code stored in the memory 1304 to perform the operation steps of constructing a super frame of a virtual elastic CPRI, where the super frame of the virtual elastic CPRI is a data frame of a CPRI physical interface that is equivalent to N times of a reference rate, and N is a positive integer, dividing a frame structure of a physical interface into multiple timeslots, where bandwidth of the timeslots is not less than the reference rate, placing the super frame of the virtual elastic CPRI into at least one timeslot of the multiple timeslots in the frame structure of the physical interface to obtain a new data frame, and sending the new data frame to a receive end using the physical interface and using the transmitter 1305.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also appreciate that all the embodiments described in the specification are example embodiments, and the related actions and modules are not necessarily mandatory to the present disclosure.

In the foregoing embodiments, the description of each embodiment has respective focuses. For a part that is not described in detail in an embodiment, reference may be made to related descriptions in other embodiments.

A person of ordinary skill in the art may understand that all or some of the steps of the methods in the embodiments may be implemented by a program instructing relevant hardware. The program may be stored in a computer readable storage medium. The storage medium may include a flash memory, a Read-Only Memory (ROM), a RAM, a magnetic disk, and an optical disc.

The content downloading method, the related device, and the system provided in the embodiments of the present disclosure are described in detail above. The principle and implementation of the present disclosure are described herein through specific examples. The description about the embodiments is merely provided to help understand the method and core ideas of the present disclosure. In addition, a person of ordinary skill in the art can make variations and modifications in terms of the specific implementations and application scopes according to the ideas of the present disclosure. Therefore, the content of this specification shall not be construed as a limitation on the present disclosure.

What is claimed is:

1. A data frame transmission method for a Common Public Radio Interface (CPRI), comprising:
constructing a super frame of the CPRI, wherein the super frame is equivalent to a data frame of a CPRI physical interface N times a reference rate, wherein N is a positive integer, wherein constructing the super frame of the CPRI comprises arranging data frames of at least one CPRI physical interfaces in a sequence in the super frame, wherein the at least one CPRI physical interface is equivalent to M times the reference rate, and wherein M is a positive integer different from N;
dividing a data frame structure of a physical interface into a plurality of timeslots, wherein bandwidth of the plurality of timeslots is not less than the reference rate;
placing the super frame into at least one of the timeslots to obtain a new data frame structure;
sending the new data frame structure to a receive end using the physical interface; and
setting a control word of a basic frame of the new data frame structure as a protocol channel for negotiating a mapping relationship with the receive end.

2. The method according to claim 1, wherein the physical interface comprises the CPRI physical interface, wherein dividing the frame structure comprises dividing a frame structure except a first synchronization byte of the super frame into a plurality of timeslots according to a quantity of bytes of each word in the super frame, and wherein the first synchronization byte comprises a first word of a first basic frame of a plurality of basic frames in the super frame.

3. The method according to claim 2, wherein placing the super frame into the at least one timeslot comprises placing another byte other than a second synchronization byte in the super frame into at least one of the timeslots to obtain the new data frame structure, and wherein the second synchronization byte comprises the first word of the first basic frame.

4. The method according to claim 1, wherein the physical interface comprises an Ethernet physical interface, and wherein dividing the frame structure of the physical interface comprises dividing, per byte, a frame structure except a frame overhead and a synchronization header in one frame period of the Ethernet physical interface into a plurality of timeslots that alternate at intervals.

5. The method according to claim 4, wherein placing the super frame into the at least one timeslot comprises placing the super frame into at least one of the timeslots that alternate at intervals in the frame structure in the one frame period of the Ethernet physical interface.

6. The method according to claim 1, wherein placing the super frame into the at least one timeslot comprises placing, according to a byte arrangement sequence in the super frame, the super frame into the at least one timeslot of the plurality of timeslots to obtain the new data frame structure.

7. The method according to claim 1, wherein after placing the super frame into the at least one timeslot, the method further comprises labeling the at least one timeslot in the new data frame using an interface identifier (ID) to represent the at least one timeslot carrying the super frame structure.

8. The method according to claim 7, wherein after labeling the at least one timeslot in the new data frame structure using the interface ID, the method further comprises adjusting a quantity of interface IDs corresponding to the at least one timeslot to change a quantity of the timeslots occupied by the super frame.

9. The method according to claim 8, wherein adjusting the quantity of the interface IDs corresponding to the at least one timeslot comprises:
    labeling a target timeslot except the at least one timeslot in the new data frame structure using the interface ID; and
    adding the target timeslot to a next data frame of the new data frame structure to carry the super frame of the CPRI.

10. A data frame transmission apparatus for a Common Public Radio Interface (CPRI), comprising:
    a memory comprising instructions; and
    a processor coupled to the memory, wherein the instructions cause the processor to be configured to:
        construct a super frame of the CPRI, wherein the super frame is equivalent to a data frame of a CPRI physical interface times a reference rate, wherein N is a positive integer, wherein constructing the super frame of the CPRI comprises arranging data frames of at least one CPRI physical interfaces in a sequence in the super frame, wherein the at least one CPRI physical interface is equivalent to M times the reference rate, and wherein M is a positive integer different from N;
        divide a data frame structure of a physical interface into a plurality of timeslots, wherein bandwidth of the plurality of timeslots is not less than the reference rate;
        place the super frame of the CPRI into at least one of the timeslots in the frame structure to obtain a new data frame structure;
        send the new data frame structure to a receive end using the physical interface; and
        set a control worn of a basic frame of the new data frame structure as a protocol channel for negotiating a mapping relationship with the receive end.

11. The apparatus according to claim 10, wherein the physical interface comprises the CPRI physical interface, wherein the instructions further cause the processor to be configured to divide a frame structure except a first synchronization byte of a super frame of the CPRI physical interface into a plurality of timeslots according to a quantity of bytes of each word in the super frame of the CPRI physical interface, and wherein the first synchronization byte comprises a first word of a first basic frame of a plurality of basic frames in the super frame of the CPRI physical interface.

12. The apparatus according to claim 11, wherein the instructions further cause the processor to be configured to place another byte other than a second synchronization byte in the super frame of the CPRI into at least one of the timeslots in the frame structure to obtain the new data frame structure, and wherein the second synchronization byte comprises the first word of the first basic frame.

13. The apparatus according to claim 10, wherein the physical interface comprises an Ethernet physical interface, and wherein the instructions further cause the processor to be configured to divide, per byte, a frame structure except a frame overhead and a synchronization header in one frame period of the Ethernet physical interface into a plurality of timeslots that alternate at intervals.

14. The apparatus according to claim 13, wherein the instructions further cause the processor to be configured to place the super frame into at least one of the timeslots that alternate at intervals in the one frame period of the Ethernet physical interface.

15. The apparatus according to claim 10, wherein the instructions further cause the processor to be configured to place, according to a byte arrangement sequence in the super frame of the CPRI, the super frame into the at least one timeslot to obtain the new data frame structure.

16. The apparatus according to claim 10, wherein the instructions further cause the processor to be configured to label at least one timeslot of a plurality of timeslots in the new data frame structure using an interface identifier (ID) to represent the at least one timeslot carrying the super frame of the CPRI.

17. The apparatus according to claim 16, wherein the instructions further cause the processor to be configured to adjust a quantity of interface IDs corresponding to the at least one timeslot to change a quantity of a plurality of timeslots occupied by the super frame of the CPRI.

18. The apparatus according to claim 17, wherein the instructions further cause the processor to be configured to:
    label a target timeslot except the at least one timeslot of the plurality of timeslots in the new data frame structure using the interface ID; and
    add the target timeslot to a next data frame of the new data frame structure to carry the super frame of the CPRI.

19. The apparatus according to claim 10, wherein the physical interface comprises a first physical interface and a second physical interface that is cascaded with the first physical interface, and wherein the instructions further cause the processor to be configured to:
    label a control word of a first basic frame of the new data frame structure by separately using an interface label of the first physical interface and an interface label of the second physical interface to represent a cascading relationship between the first physical interface and the second physical interface, wherein the control word comprises a first word of a basic frame; and label a control word of a third basic frame of the new data group using a group ID (GID), wherein the GID represents that the first physical interface and the second physical interface both belong to one cascading group configured to carry the super frame of the CPRI.

20. A data frame transmission apparatus for a Common Public Radio Interface (CPRI), comprising:

a network interface;

a memory coupled to the network interface and configured to store a program code; and a processor coupled to the network interface and the memory, wherein the program code stored in the memory causes the processor to be configured to:

construct a super frame of the CPRI, wherein the super frame is equivalent to a data frame of a CPRI physical interface N times a reference rate, wherein N is a positive integer, wherein constructing the super frame of the CPRI comprises arranging data frames of at least one CPRI physical interfaces in a sequence in the super frame, wherein the at least one CPRI physical interface is equivalent to M times the reference rate, and wherein M is a positive integer different from N;

divide a data frame structure of a physical interface into a plurality of timeslots, wherein bandwidth of the plurality of timeslots is not less than the reference rate;

place the super frame into at least one of the timeslots in the frame structure to obtain a new data frame structure;

send the new data frame structure to a receive end using the physical interface; and set a control word of a basic frame of the new data frame structure as a protocol channel for negotiating a mapping relationship with the receive end.

21. The data frame transmission apparatus according to claim 20, wherein the mapping relationship is configured to enable the receive end to obtain the super frame by transforming the new data frame structure according to the mapping relationship.

22. The data frame transmission apparatus according to claim 20, wherein the processor is further configured to increase an overhead bearing area of the frame structure such that a bandwidth of the at least one timeslot is greater than the reference rate, and wherein the reference rate is 491.52 megabits per second (Mbps).

23. The data frame transmission apparatus according to claim 20, wherein N is equal to 2 such that the at least one CPRI physical interface is equivalent to two times of the reference rate, and wherein the reference rate is 491.52 megabits per second (Mbps).

* * * * *

UNITED STATES PATENT AND TRADEMARK OFFICE
CERTIFICATE OF CORRECTION

PATENT NO. : 10,869,222 B2  
APPLICATION NO. : 15/870383  
DATED : December 15, 2020  
INVENTOR(S) : Qiwen Zhong and Qiuyou Wu Page 1 of 1

It is certified that error appears in the above-identified patent and that said Letters Patent is hereby corrected as shown below:

On the Title Page

Page 2, (56) References Cited, Foreign Patent Documents: "EP 2786209 A1 5/2014" should read "EP 2736209 A1 5/2014"

In the Claims

Claim 1, Column 22, Line 43: "physical interfaces in a sequence" should read "physical interface in a sequence"

Claim 10, Column 24, Line 1: "control worn of a basic" should read "control word of a basic"

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*